US011838950B2

(12) United States Patent
Liu et al.

(10) Patent No.: US 11,838,950 B2
(45) Date of Patent: Dec. 5, 2023

(54) MULTI-OPPORTUNITY GRANT AND HARQ CODEBOOK FOR SIDELINK OPERATIONS

(71) Applicant: QUALCOMM Incorporated, San Diego, CA (US)

(72) Inventors: Chih-Hao Liu, San Diego, CA (US); Yisheng Xue, San Diego, CA (US); Jing Sun, San Diego, CA (US); Xiaoxia Zhang, San Diego, CA (US); Piyush Gupta, Bridgewater, NJ (US); Tao Luo, San Diego, CA (US); Juan Montojo, San Diego, CA (US); Peter Gaal, San Diego, CA (US); Sony Akkarakaran, Poway, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 17/243,325

(22) Filed: Apr. 28, 2021

(65) Prior Publication Data
US 2022/0353915 A1 Nov. 3, 2022

(51) Int. Cl.
*H04W 74/08* (2009.01)
*H04W 74/00* (2009.01)
*H04W 72/1263* (2023.01)
*H04W 72/0446* (2023.01)
*H04W 72/23* (2023.01)

(52) U.S. Cl.
CPC ... *H04W 74/0816* (2013.01); *H04W 72/0446* (2013.01); *H04W 72/1263* (2013.01); *H04W 72/23* (2023.01); *H04W 74/008* (2013.01)

(58) Field of Classification Search
CPC ......... H04W 74/0816; H04W 72/0446; H04W 72/1263; H04W 72/23; H04W 74/008
See application file for complete search history.

(56) References Cited

U.S. PATENT DOCUMENTS

| | | | |
|---|---|---|---|
| 2018/0034683 A1* | 2/2018 | Li | H04W 52/04 |
| 2018/0035427 A1* | 2/2018 | Gupta | H04W 72/21 |
| 2018/0049143 A1* | 2/2018 | Gupta | H04W 16/14 |
| 2018/0070252 A1* | 3/2018 | Gupta | H04W 24/08 |
| 2018/0160333 A1* | 6/2018 | Patil | H04W 28/0236 |
| 2019/0140796 A1* | 5/2019 | Wang | H04W 72/21 |
| 2019/0141726 A1* | 5/2019 | Wang | H04L 5/0048 |
| 2019/0246430 A1* | 8/2019 | Baghel | H04W 4/40 |
| 2019/0246431 A1* | 8/2019 | Baghel | H04W 74/0816 |
| 2019/0273592 A1* | 9/2019 | Baghel | H04L 5/0048 |
| 2019/0319768 A1* | 10/2019 | Wu | H04L 1/1671 |
| 2020/0008183 A1* | 1/2020 | Chen | H04W 72/20 |
| 2020/0015176 A1* | 1/2020 | Li | H04L 1/1861 |

(Continued)

*Primary Examiner* — Jael M Ulysse
(74) *Attorney, Agent, or Firm* — ArentFox Schiff LLP

(57) ABSTRACT

Aspects described herein relate to sidelink transmissions. In an example, a first user equipment (UE) may receive a multi-opportunity grant from a network entity, the multi-opportunity grant indicating multiple listen-before-talk (LBT) opportunities for scheduling a transmission between the first UE and a second UE; perform a LBT procedure for one or more slots of a plurality of slots indicated by the multiple LBT opportunities; select a first slot of the plurality of slots corresponding to an earliest available LBT based on performing the LBT procedure; and communicate a transmission to the second UE during the transmission time interval (TTI) of the first slot.

30 Claims, 13 Drawing Sheets

(56) References Cited

U.S. PATENT DOCUMENTS

| | | | |
|---|---|---|---|
| 2020/0037343 A1* | 1/2020 | He | H04W 28/0268 |
| 2020/0092685 A1* | 3/2020 | Fehrenbach | H04W 72/23 |
| 2020/0106567 A1* | 4/2020 | Bharadwaj | H04L 1/1887 |
| 2020/0107312 A1* | 4/2020 | Baghel | H04L 5/0094 |
| 2020/0107351 A1* | 4/2020 | Lee | H04L 5/0053 |
| 2020/0120458 A1* | 4/2020 | Aldana | H04W 36/08 |
| 2020/0146044 A1* | 5/2020 | Maaref | H04W 92/18 |
| 2020/0236656 A1* | 7/2020 | Cao | H04W 80/02 |
| 2020/0267729 A1* | 8/2020 | Kim | H04W 72/20 |
| 2020/0275474 A1* | 8/2020 | Chen | H04L 1/1848 |
| 2020/0336253 A1* | 10/2020 | He | H04W 4/40 |
| 2020/0403737 A1* | 12/2020 | Yeo | H04L 1/1861 |
| 2021/0051525 A1* | 2/2021 | Cao | H04W 72/02 |
| 2021/0127413 A1* | 4/2021 | Lu | H04W 72/044 |
| 2021/0219268 A1* | 7/2021 | Li | H04W 72/20 |
| 2021/0307023 A1* | 9/2021 | He | H04W 72/044 |
| 2022/0224497 A1* | 7/2022 | Li | H04W 74/0808 |
| 2022/0263613 A1* | 8/2022 | Fan | H04L 5/006 |
| 2022/0287086 A1* | 9/2022 | Hwang | H04W 72/02 |
| 2022/0312389 A1* | 9/2022 | Li | H04W 72/02 |
| 2022/0361204 A1* | 11/2022 | Zhao | H04W 72/20 |
| 2022/0417976 A1* | 12/2022 | Park | H04L 5/0078 |

* cited by examiner

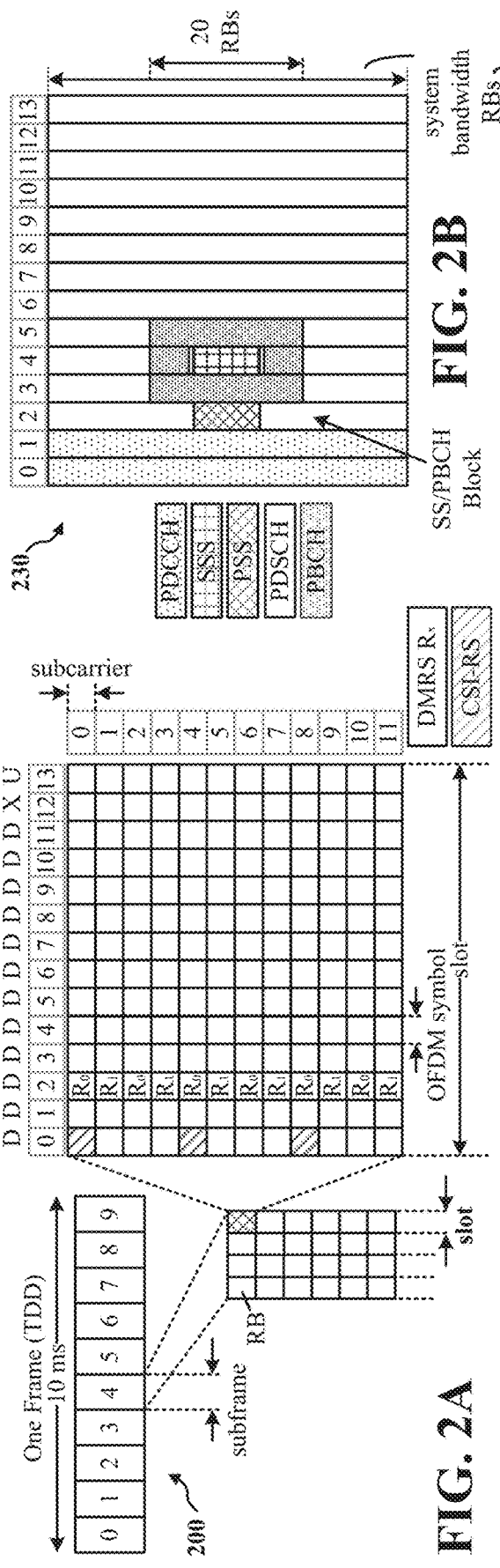
FIG. 2A
FIG. 2B
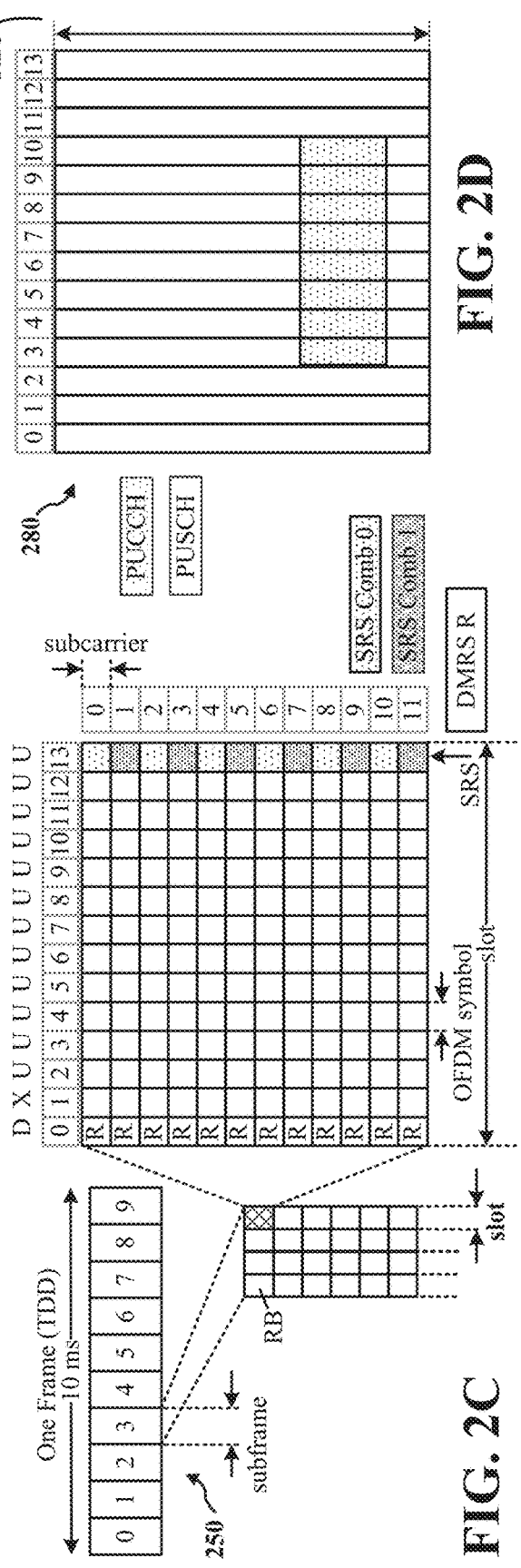
FIG. 2C
FIG. 2D

MULTI-OPPORTUNITY GRANT AND HARQ CODEBOOK FOR SIDELINK OPERATIONS

BACKGROUND

Technical Field

Aspects of the present disclosure relate generally to wireless communication systems, and more particularly, to apparatuses and methods of scheduling for sidelink operations, where sidelink is a direct link between two devices.

Introduction

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, for various communications technology such as, but not limited to NR, full duplex communication with respect to integrated access and backhaul (IAB) implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a first user equipment (UE). The method may include receiving a multi-opportunity grant from a network entity, the multi-opportunity grant indicating multiple listen-before-talk (LBT) opportunities for scheduling a transmission between the first UE and a second UE; performing a LBT procedure for one or more slots of a plurality of slots indicated by the multiple LBT opportunities; selecting a first slot of the plurality of slots corresponding to an earliest available LBT based on performing the LBT procedure; and communicating a transmission to the second UE during the transmission time interval (TTI) of the first slot.

In a further example, an apparatus for wireless communication is provided that includes a transceiver, a memory configured to store instructions, and one or more processors communicatively coupled with the transceiver and the memory. The one or more processors are configured to execute the instructions to receive a multi-opportunity grant from a network entity, the multi-opportunity grant indicating multiple LBT opportunities for scheduling a transmission between the first UE and a second UE; perform a LBT procedure for one or more slots of a plurality of slots indicated by the multiple LBT opportunities; select a first slot of the plurality of slots corresponding to an earliest available LBT based on performing the LBT procedure; and communicate a transmission to the second UE during the TTI of the first slot.

In another aspect, an apparatus for wireless communication is provided that includes means for receiving a multi-opportunity grant from a network entity, the multi-opportunity grant indicating multiple LBT opportunities for scheduling a transmission between the first UE and a second UE; performing a LBT procedure for one or more slots of a plurality of slots indicated by the multiple LBT opportunities; selecting a first slot of the plurality of slots corresponding to an earliest available LBT based on performing the LBT procedure; and communicating a transmission to the second UE during the TTI of the first slot.

In yet another aspect, a non-transitory computer-readable medium is provided including code executable by one or more processors to receive a multi-opportunity grant from a network entity, the multi-opportunity grant indicating multiple LBT opportunities for scheduling a transmission between the first UE and a second UE; perform a LBT procedure for one or more slots of a plurality of slots indicated by the multiple LBT opportunities; select a first slot of the plurality of slots corresponding to an earliest available LBT based on performing the LBT procedure; and communicate a transmission to the second UE during the TTI of the first slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 2A is a diagram illustrating an example of a first 5G NR frame, in accordance with various aspects of the present disclosure;

FIG. 2B is a diagram illustrating an example of DL channels within a 5G NR subframe, in accordance with various aspects of the present disclosure;

FIG. 2C is a diagram illustrating an example of a second 5G NR frame, in accordance with various aspects of the present disclosure;

FIG. 2D is a diagram illustrating an example of UL channels within a 5G NR subframe, in accordance with various aspects of the present disclosure, in accordance with various aspects of the present disclosure;

DETAILED DESCRIPTION

Figure 1:
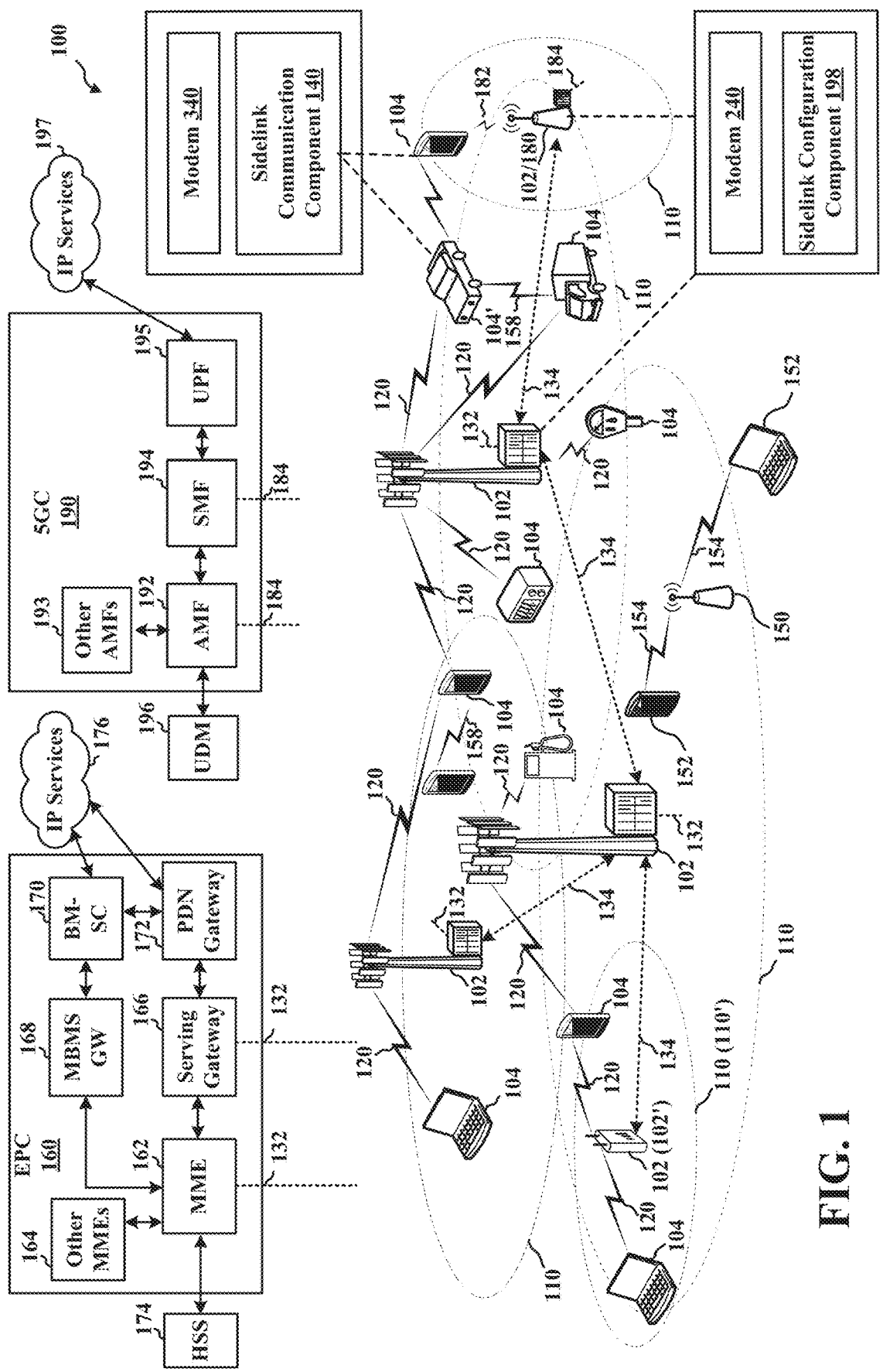
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to synchronization signals for direct link communications of device-to-device (D2D) communication technologies. As used herein, a direct link refers to a direct wireless communications path from a first wireless device to a second wireless device. For example, in fifth generation (5G) new radio (NR) communication technologies a direct link between two user equipment (UEs) may be referred to as a sidelink (SL), as opposed to communications over the Uu interface (e.g., from gNB to UE). Direct links may be utilized in D2D communication technologies that can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a direct link channel.

A UE may be configured for mode 1 sidelink scheduling in which the base station (e.g., gNB) may be responsible for scheduling sidelink transmissions between UEs. The base station may transmit a grant (e.g., downlink control information (DCI)) on a physical downlink control channel (PDCCH) to a transmitting UE and/or the receiving UE. The transmitting UE may transmit a physical sidelink control channel (PSCCH) to provide additional information about the transmission (e.g., modulation and coding scheme (MCS)). Hybrid automatic repeat request (HARD) acknowledgments for sidelink communications may be transmitted either via the Uu link to the base station or via the sidelink (e.g., on a physical sidelink feedback channel (PSFCH). For example, the base station assigns orthogonal resources for a first UE (e.g., a transmitter UE) to transmit via the DCI (e.g., DCI3_0). In this example, the DCI specifies the starting subchannel, number of subchannels, and a slot for the first UE to transmit. The base station ensures that the allocation is orthogonal.

In the unlicensed band, the transmissions by the first UE are subject to performing a listen-before-talk (LBT) procedure. Failure of the LBT procedure may require additional DCI grants from the base station which would result in control signal overhead and introduction of extra delays for time sensitive data.

Hence, the present disclosure provides for a multi-opportunity grant and HARQ codebook for sidelink communications. As such, the present implementations provide for receiving a multi-opportunity grant from a network entity, the multi-opportunity grant indicating multiple LBT opportunities for scheduling a transmission between the first UE and a second UE; performing a LBT procedure for one or more slots of a plurality of slots indicated by the multiple LBT opportunities; selecting a first slot of the plurality of slots corresponding to an earliest available LBT based on performing the LBT procedure; and communicating a transmission to the second UE during the transmission time interval (TTI) of the first slot.

The described features will be presented in more detail below with reference to FIGS. 1-13.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102, which may also be referred to as a network entity, may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some nodes such as base station 102/gNB 180, may have a modem 240 and sidelink configuration component 198 that is configured to transmit a multi-opportunity grant for sidelink communications, as described herein. Though a base station 102/gNB 180 is shown as having the modem 240 and sidelink configuration component 198, this is one illustrative example, and substantially any node or type of node may include a modem 240 and sidelink configuration component 198 for providing corresponding functionalities described herein.

In some examples, the UE 104 may have a modem 340 and sidelink communication component 140 that controls sidelink communications. The sidelink communication component 140 may be configured to receive a multi-opportunity grant from base station 102/gNB 180, the multi-opportunity grant indicating multiple LBT opportunities for scheduling a transmission between the first UE 104 and a second UE 104'; perform a LBT procedure for one or more slots of a plurality of slots indicated by the multiple LBT opportunities; select a first slot of the plurality of slots corresponding to an earliest available LBT based on performing the LBT procedure; and communicate a transmission to the second UE 104' during the TTI of the first slot.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a AMF 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 9:
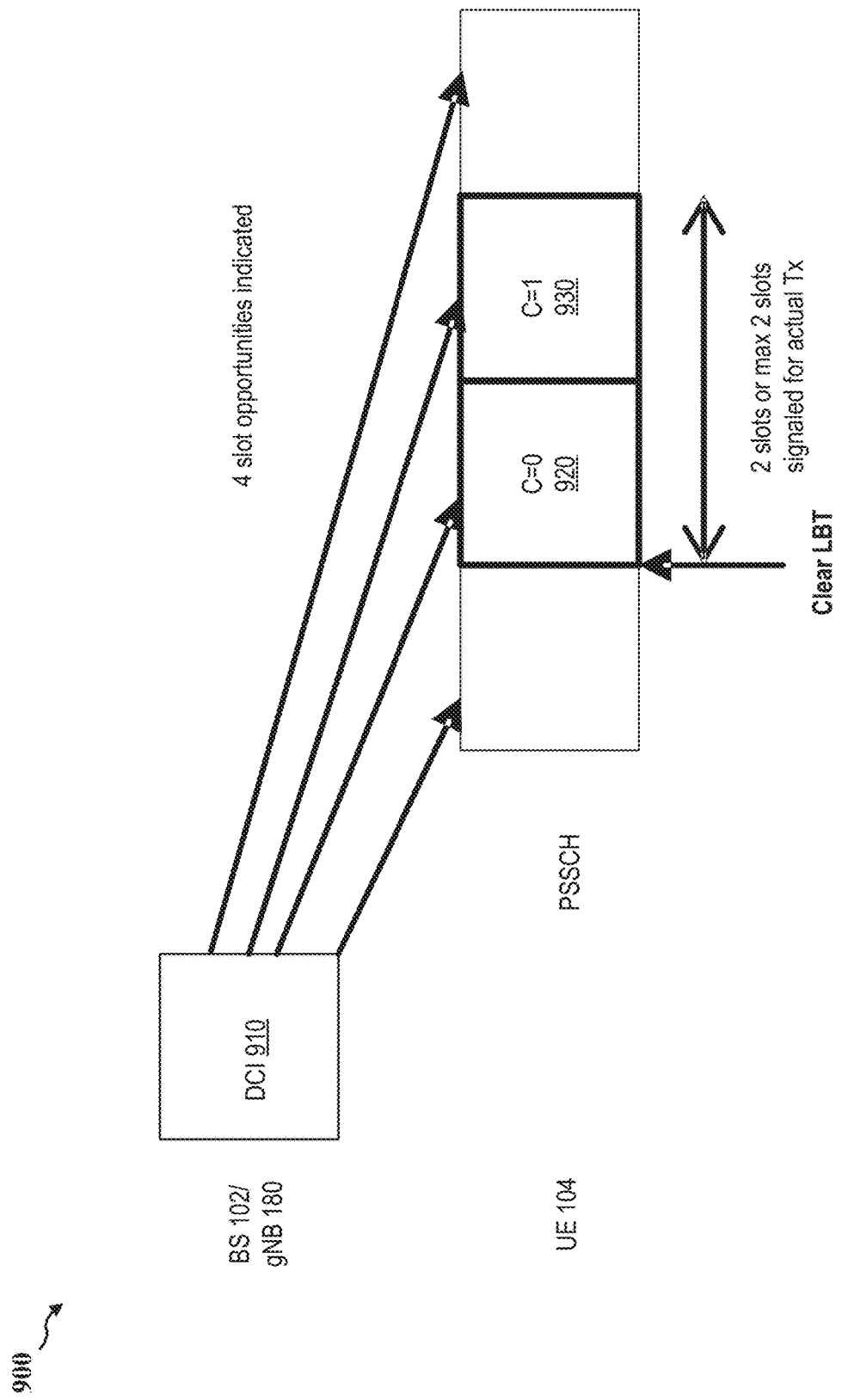
FIG. 9 is a diagram of an example of a hybrid automatic repeat request (HARQ) codebook configuration for sidelink communications, in accordance with various aspects of the present disclosure.
Figure 10:
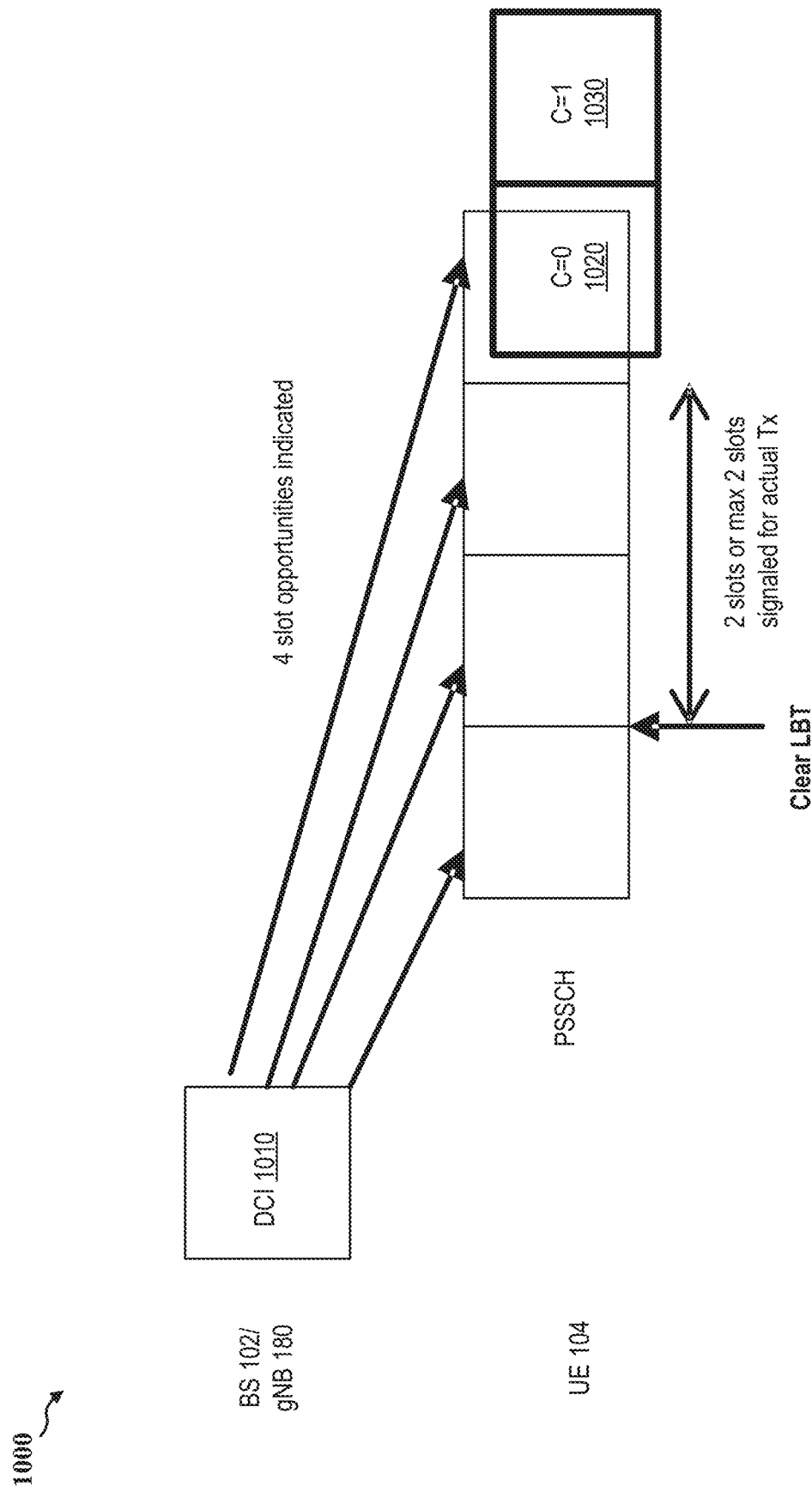
FIG. 10 is a diagram of another example of a HARQ codebook configuration for sidelink communications, in accordance with various aspects of the present disclosure.
Figure 11:
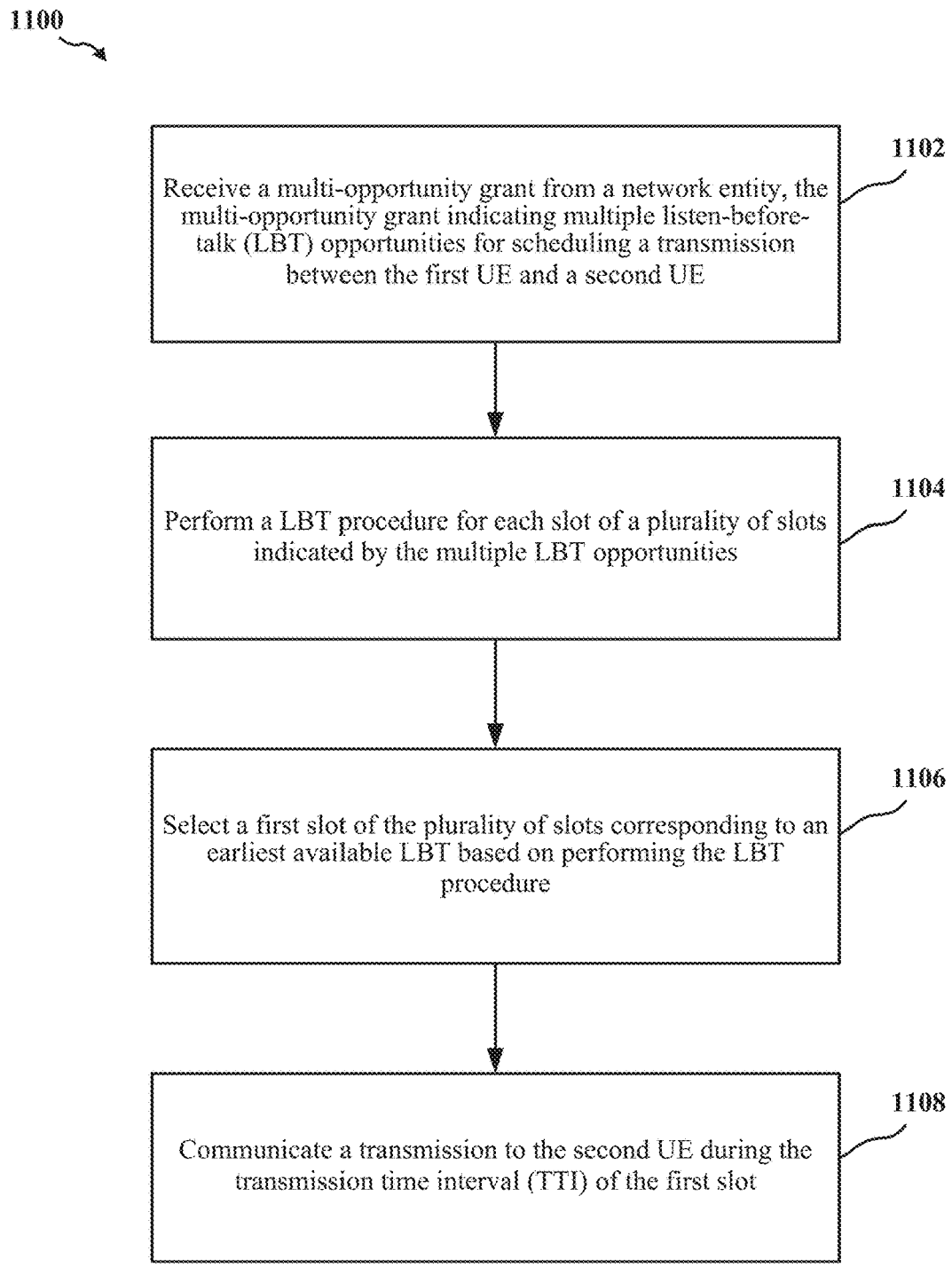
FIG. 11 is a flow chart illustrating an example of a method for wireless communications at a first UE in accordance with various aspects of the present disclosure.

Turning now to FIGS. 2-13, aspects are depicted with reference to one or more components and one or more methods that may perform the actions or operations described herein, where aspects in dashed line may be optional. Although the operations described below in FIG. 11 is presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
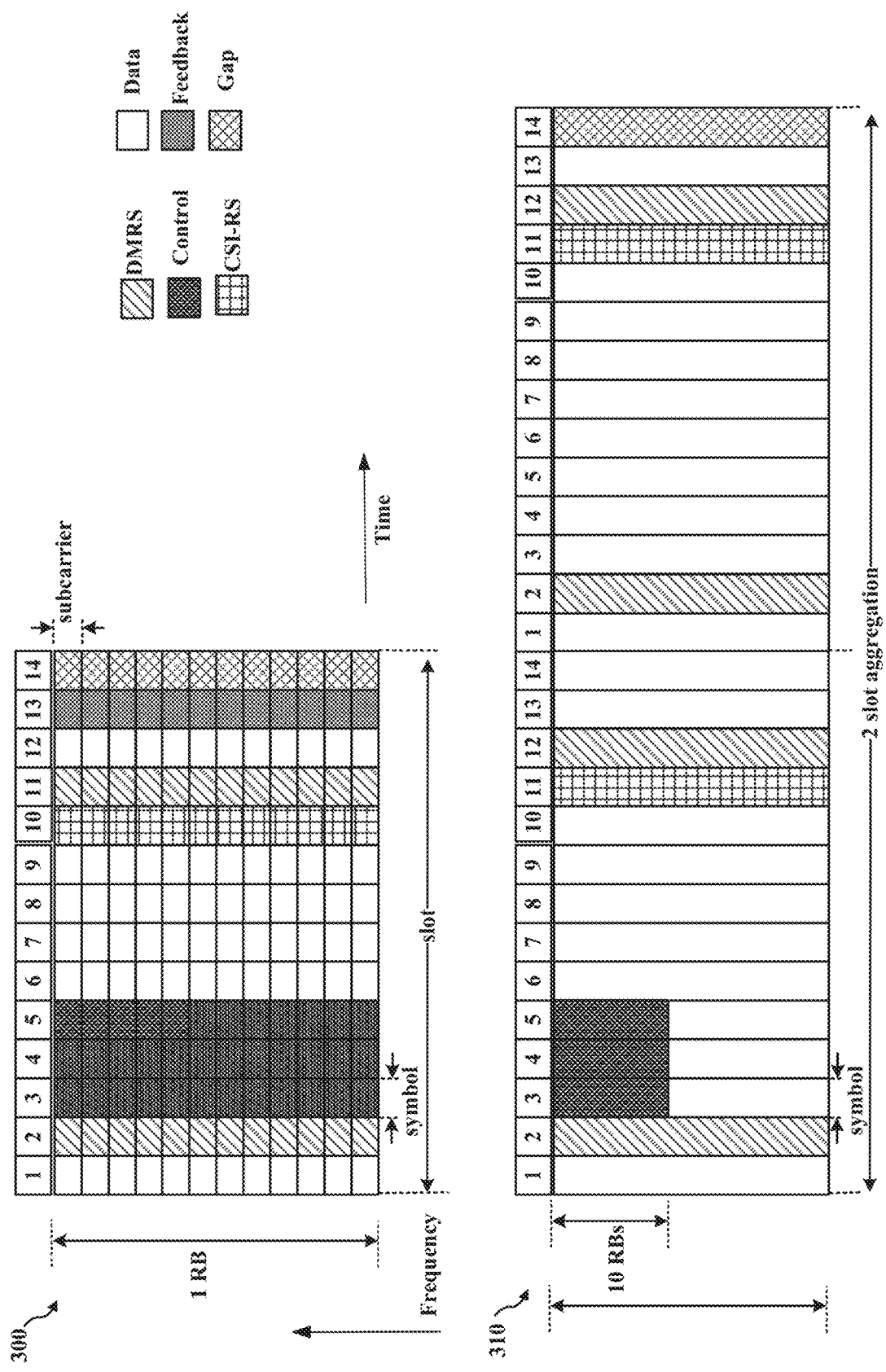
FIG. 3 illustrates example aspects of a sidelink slot structure, in accordance with various aspects of the present disclosure.

FIG. 3 illustrates example diagrams 300 and 310 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include minislots, which may include 7, 4, or 3 symbols. Each slot may include 7 or 14 symbols, depending on the slot configuration. For slot configuration 0, each slot may include 14 symbols, and for slot configuration 1, each slot may include 7 symbols. Diagram 300 illustrates a single slot transmission, e.g., which may correspond to a 0.5 ms transmission time interval (TTI). Diagram 310 illustrates an example two-slot aggregation, e.g., an aggregation of two 0.5 ms TTIs. Diagram 300 illustrates a single RB, whereas diagram 310 illustrates N RBs. In diagram 310, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 3, some of the REs may comprise control information, e.g., along with demodulation RS (DMRS). FIG. 3 also illustrates that symbol(s) may comprise CSI-RS. The symbols in FIG. 3 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 3, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. Multiple slots may be aggregated together. FIG. 3 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 4:
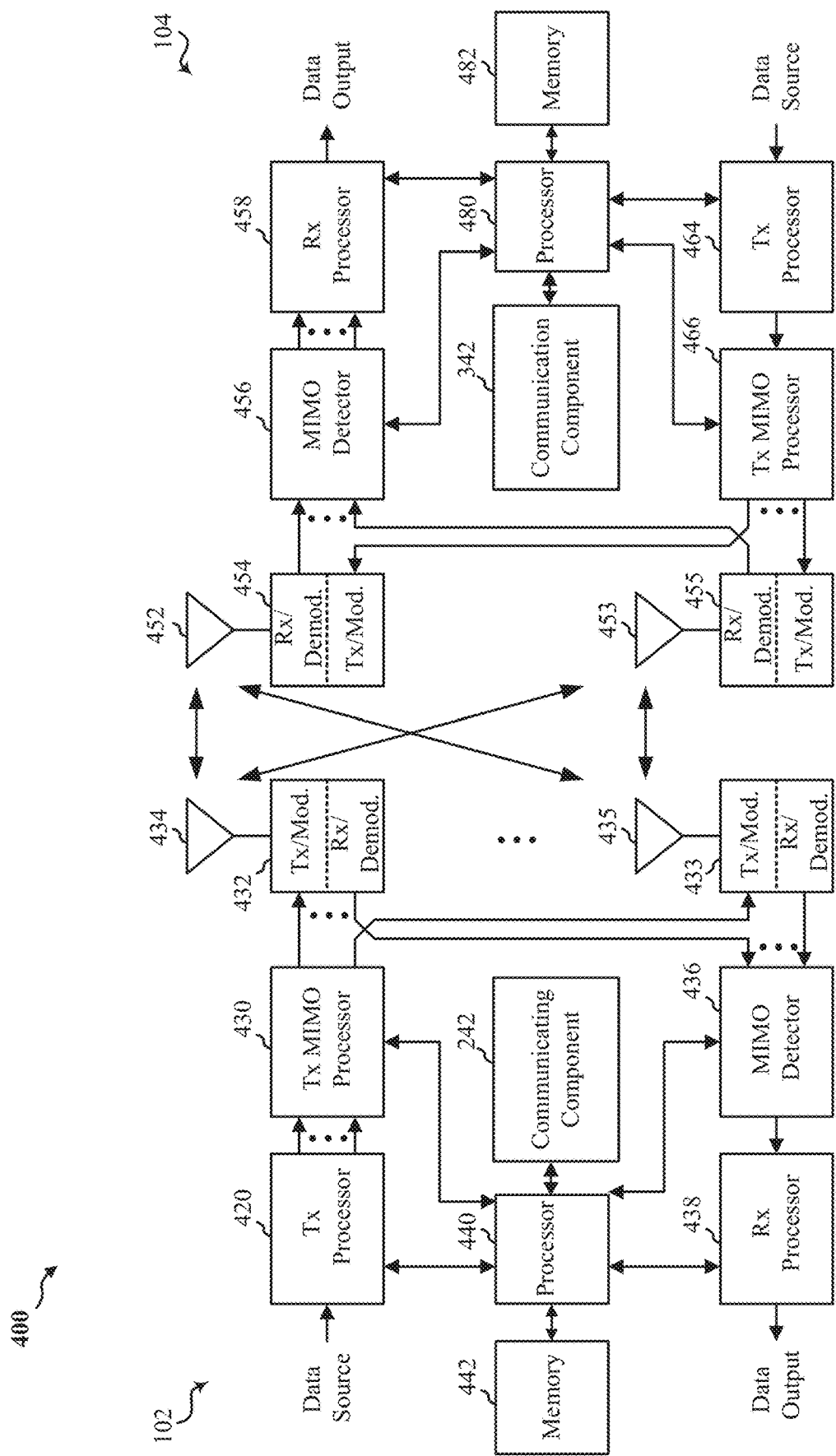
FIG. 4 is a block diagram illustrating an example of a MIMO communication system including a base station and a user equipment (UE), in accordance with various aspects of the present disclosure.

FIG. 4 is a block diagram of a MIMO communication system 400 including a base station 102, and a UE 104. The MIMO communication system 400 may illustrate aspects of the wireless communication access network 100 described with reference to FIG. 1. The base station 102 may be an example of aspects of the base station 102 described with reference to FIG. 1. The base station 102 may be equipped with antennas 434 and 435, and the UE 104 may be equipped with antennas 452 and 453. In the MIMO communication system 400, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 420 may receive data from a data source. The transmit processor 420 may process the data. The transmit processor 420 may also generate control symbols or reference symbols. A transmit MIMO processor 430 may perform spatial processing (e.g., precoding) on data symbols, control symbols, or reference symbols, if applicable, and may provide output symbol streams to the transmit modulator/demodulators 432 and 433. Each modulator/demodulator 432 through 433 may process a respective output symbol stream (e.g., for OFDM, etc.) to obtain an output sample stream. Each modulator/demodulator 432 through 433 may further process (e.g., convert to analog, amplify, filter, and upconvert) the output sample stream to obtain a DL signal. In one example, DL signals from modulator/demodulators 432 and 433 may be transmitted via the antennas 434 and 435, respectively.

The UE 104 may be an example of aspects of the UEs 104 described with reference to FIGS. 1 and 17. At the UE 104, the UE antennas 452 and 453 may receive the DL signals from the base station 102 and may provide the received signals to the modulator/demodulators 454 and 455, respectively. Each modulator/demodulator 454 through 455 may condition (e.g., filter, amplify, downconvert, and digitize) a respective received signal to obtain input samples. Each modulator/demodulator 454 through 455 may further process the input samples (e.g., for OFDM, etc.) to obtain received symbols. A MIMO detector 456 may obtain received symbols from the modulator/demodulators 454 and 455, perform MIMO detection on the received symbols, if applicable, and provide detected symbols. A receive (Rx) processor 458 may process (e.g., demodulate, deinterleave, and decode) the detected symbols, providing decoded data for the UE 104 to a data output, and provide decoded control information to a processor 980, or memory 982.

Figure 12:
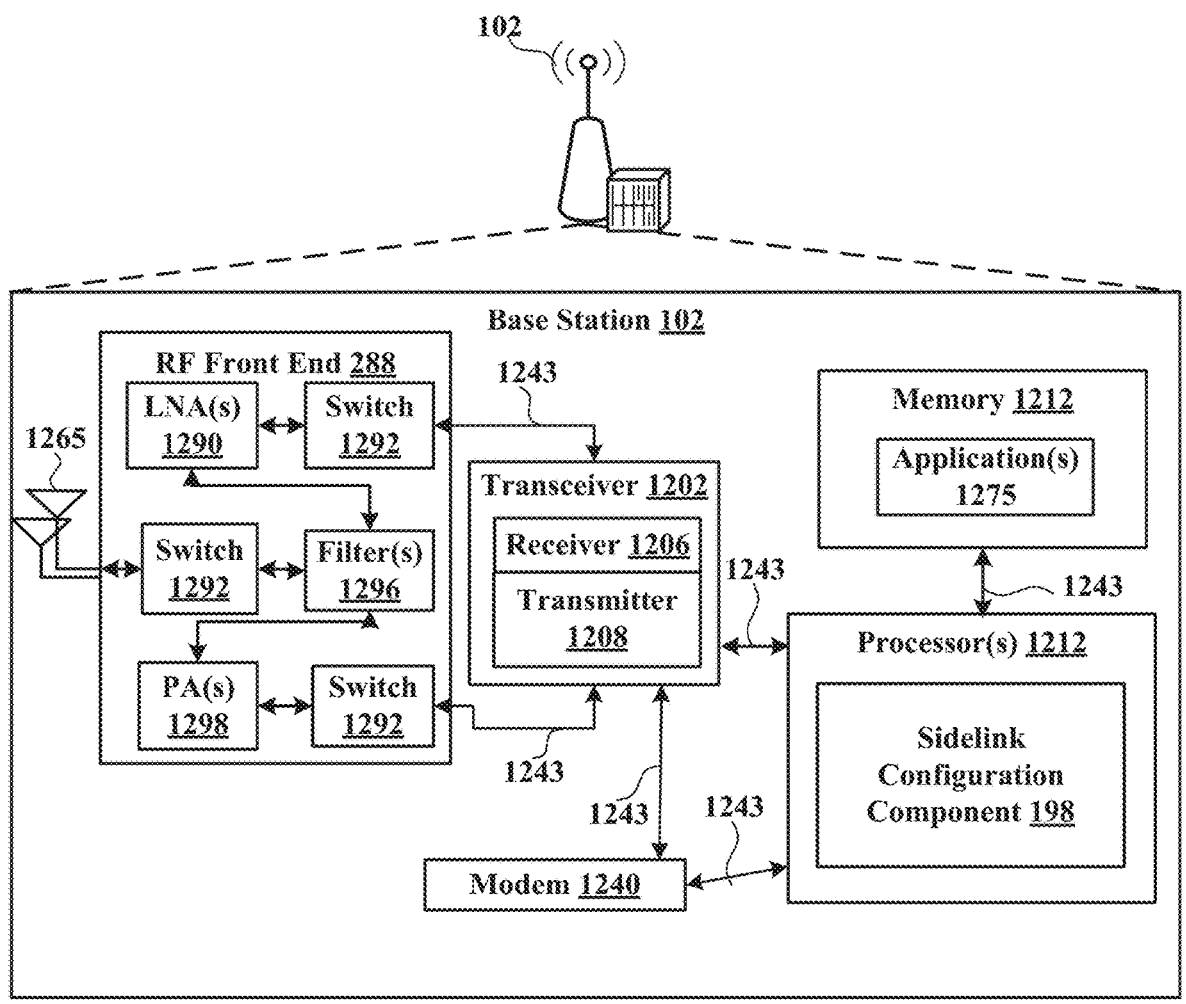
FIG. 12 is a block diagram illustrating an example of a network entity (also referred to as a base station), in accordance with various aspects of the present disclosure.

The processor 480 may in some cases execute stored instructions to instantiate a sidelink configuration component 198 (see e.g., FIGS. 1 and 12).

On the uplink (UL), at the UE 104, a transmit processor 464 may receive and process data from a data source. The transmit processor 464 may also generate reference symbols for a reference signal. The symbols from the transmit processor 464 may be precoded by a transmit MIMO processor 466 if applicable, further processed by the modulator/demodulators 454 and 455 (e.g., for SC-FDMA, etc.), and be transmitted to the base station 102 in accordance with the communication parameters received from the base station 102. At the base station 102, the UL signals from the UE 104 may be received by the antennas 434 and 435, processed by the modulator/demodulators 432 and 433, detected by a MIMO detector 436 if applicable, and further processed by a receive processor 438. The receive processor 438 may provide decoded data to a data output and to the processor 440 or memory 442. The processor 440 may in some cases execute stored instructions to instantiate a sidelink communication component 140 (see e.g., FIGS. 1 and 13).

The components of the UE 104 may, individually or collectively, be implemented with one or more ASICs adapted to perform some or all of the applicable functions in hardware. Each of the noted modules may be a means for performing one or more functions related to operation of the MIMO communication system 400. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 400.

Figure 5:
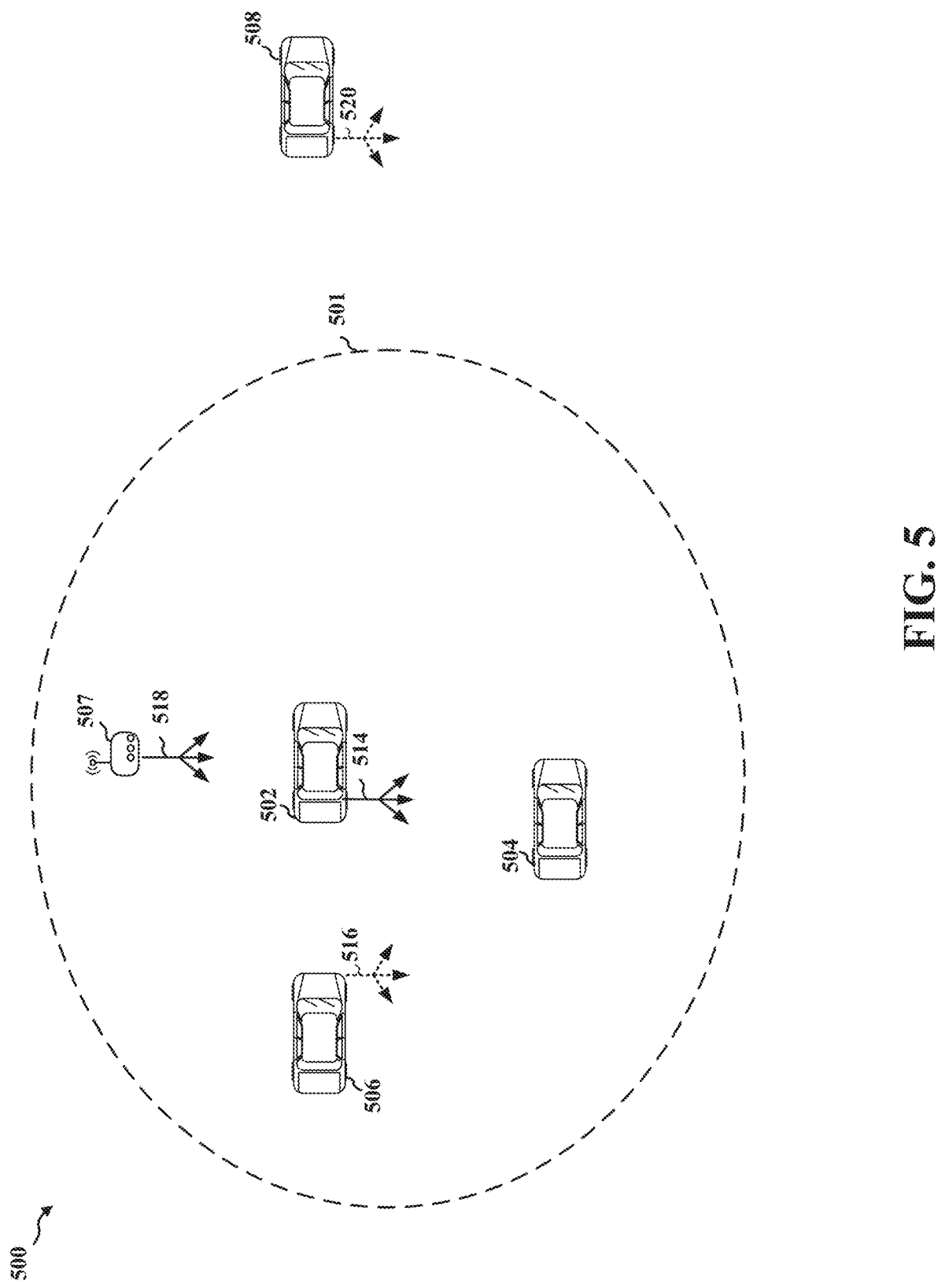
FIG. 5 is an example illustrating wireless communication between devices based on sidelink communication.

FIG. 5 illustrates an example 500 of wireless communication between devices based on sidelink (e.g., V2X/V2V/D2D) communication. The communication may be based on a slot structure comprising aspects described in connection with FIGS. 2 and 3. For example, transmitting UE 502 may transmit a transmission 514, e.g., comprising a control channel and/or a corresponding data channel, that may be received by receiving UEs 504, 506, 508. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 502, 504, 506, 508 may each be capable of operating as a transmitting device in addition to operating as a receiving device. Thus, UEs 506, 508 are illustrated as transmitting a transmissions 516, 520. The transmissions 514, 516, 520 may be broadcast or multicast to nearby devices. For example, UE 514 may transmit communication intended for receipt by other UEs within a range 501 of UE 514. Additionally/alternatively, RSU 507 may receive communication from and/or transmit communication to UEs 502, 504, 506, 508.

UE 502, 504, 506, 508 or RSU 507 may comprise a sidelink communication component 140, similar to 140 described in connection with FIG. 1.

Figure 6:
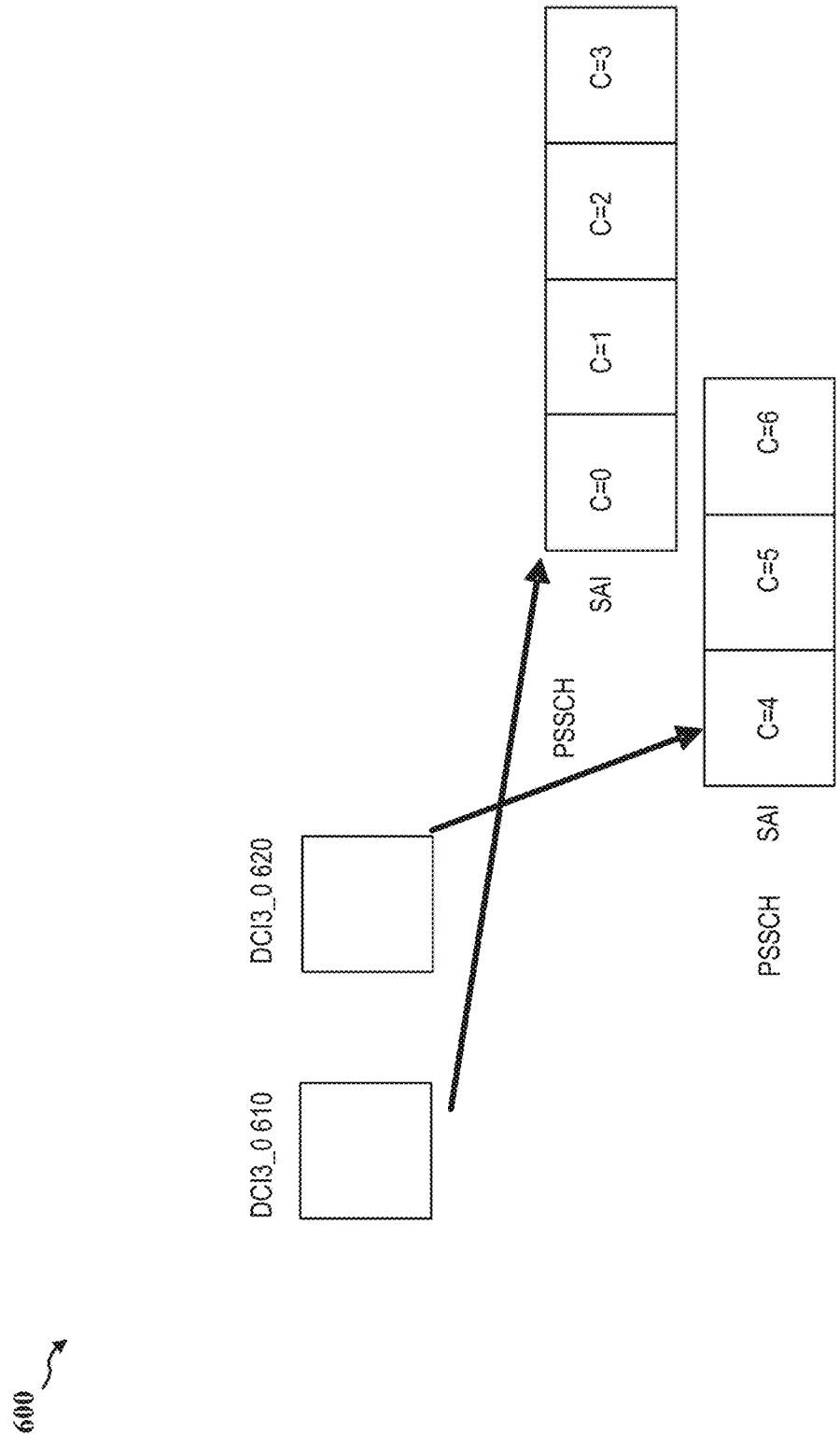
FIG. 6 is a diagram of an example of multi-transmission time interval (TTI) scheduling for sidelink communications, in accordance with various aspects of the present disclosure.

FIG. 6 illustrates an example 600 of multi-TTI scheduling for sidelink communications. The communication may be based on a slot structure comprising aspects described in connection with FIGS. 2 and 3. For example, in the downlink (DL), a UE, such as UE 104 of FIG. 1, may receive one or more grants 610 and 620 (e.g., DCI3_0) from a base station 102/gNB 180. Each of the grants 610, 620 may configure UE 104 with multi-TTI scheduling in mode 1 to transmit multiple TBs. The grants 610 and 620 may include PSFCH-to-HARQ feedback timing indication, HARQ codebook, and sidelink access information (SAI) enhancement; in addition to dynamic type-2 HARQ codebook enhancement for the multi-TTI grant 610, 620. In an example, multi-TTI grant 610 may schedule four slots on the PSSCH for sidelink transmissions while multi-TTI grant 620 may schedule three slots on the PSSCH.

In an aspect, multi-TTI provides for enhanced operations for bursty traffic where the first UE 104 (e.g., the transmitter UE) has multiple TBs scheduled for transmission. However, for V2X type traffic, UE 104 may only have a few TBs in the buffer scheduled for transmission. For multi-TTI grant, each TB is associated with at most one sidelink slot. If the LBT procedure fails at the first slot, the TB associated with the first slot is skipped in the current burst. While this scenario is permissible for bursty traffic where the first UE 104 has multiple TBs to transmit, the first UE 104 may only have TB in the buffer for each UE 104' (e.g., receiver UE) for V2X type traffic. For example, the first UE 104 may transmit TBs to different second UEs 104' in different scheduled slots. As a result of the skipped TB due to LBT failure, longer delays may occur as rescheduling from base station 102/gNB 180 is required.

Figure 7:
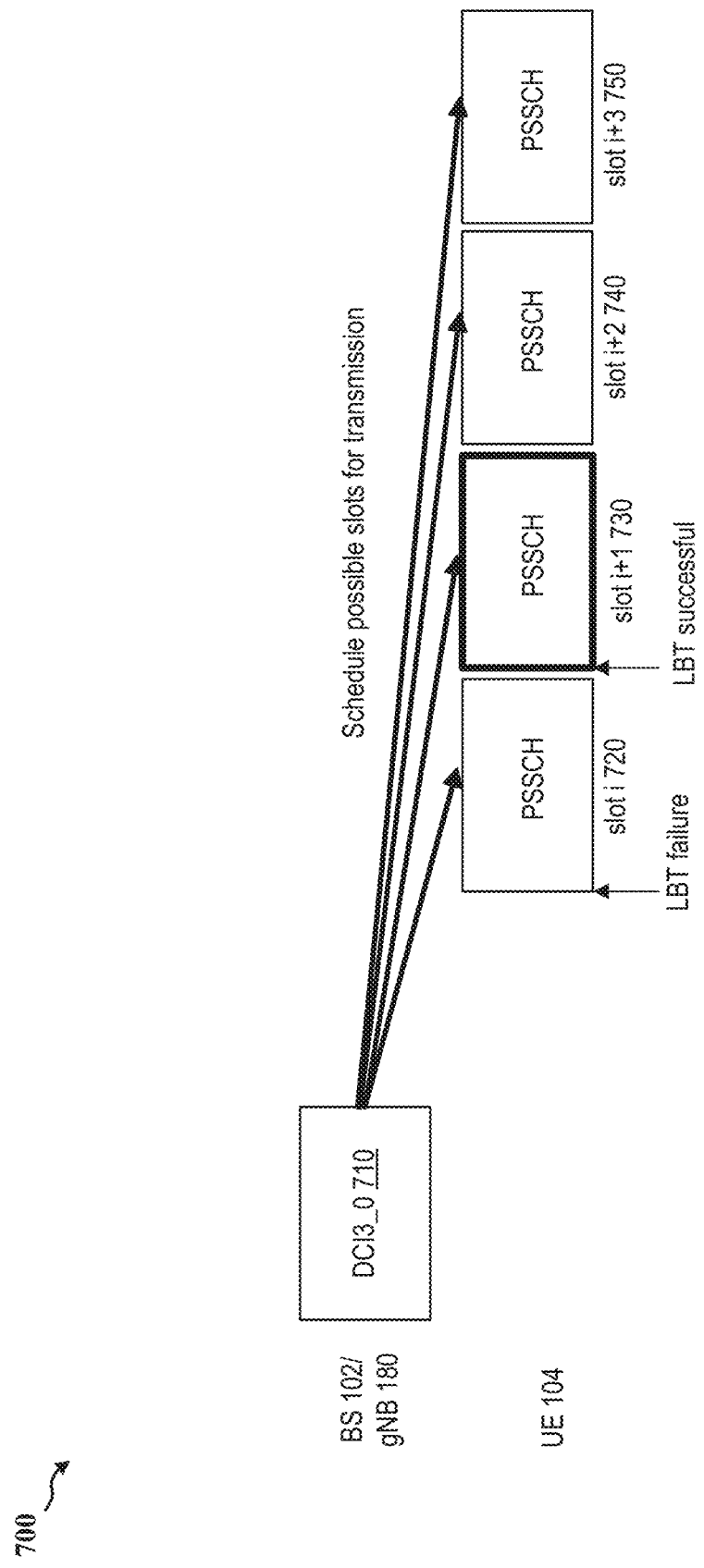
FIG. 7 is a diagram of an example of multi-opportunity grant scheduling with selective transmission for sidelink communications, in accordance with various aspects of the present disclosure.

FIG. 7 is a diagram of an example 700 of multi-opportunity grant scheduling with selective transmission for sidelink communications. The communication may be based on a slot structure comprising aspects described in connection with FIGS. 2 and 3. For example, a UE, such as UE 104 of FIG. 1, may receive a grant, such as a multi-opportunity grant 710, from base station 102/gNB 180. The multi-opportunity grant 710 may correspond to a DCI3_0. Base station 102/gNB 180 may be configured to schedule multiple TTIs for the first UE 104 from which UE 104 may select the earliest LBT cleared TTI to schedule sidelink transmissions.

In an aspect, base station 102/gNB 180 may schedule possible slots 720, 730, 740, and 750 for sidelink transmission via the multi-opportunity grant 710 in a transmission pool in a time domain resource assignment (TDRA) field. For example, base station 102/gNB 180 may use time resource assignment(s) in a sidelink control information (SCI) field (e.g., SCI-1A field) to schedule multiple slots. In an example, the legacy time resource assignment format (e.g., 9 bits) allows reservation up to 3 slots within 32 continuous slots. In another example, base station 102/gNB 180 may signal continuous slots allowing support up to scheduling up 32 continuous slots within 32 slots with legacy 9 bits.

In an aspect, UE 104 may hold the TBs in a buffer and start transmission of the first TB on the first LBT cleared slot. For example, upon receiving the multi-opportunity grant 710, UE 104 may perform an LBT procedure for slot i 720 which corresponds to the first slot indicated by the multi-opportunity grant 710. In this example, the LBT procedure for slot i 720 may result in a failure, so UE 104 does not schedule on the PSSCH on slot i 720. Instead, UE 104 may continue to perform the LBT procedure for the subsequent slots indicated by the multi-opportunity grant 710. Upon performing the LBT procedure for slot i+1 730 which resulted in a success, UE 104 may schedule a TB on slot i+1 730 for transmission to a second UE 104'.

Figure 8:
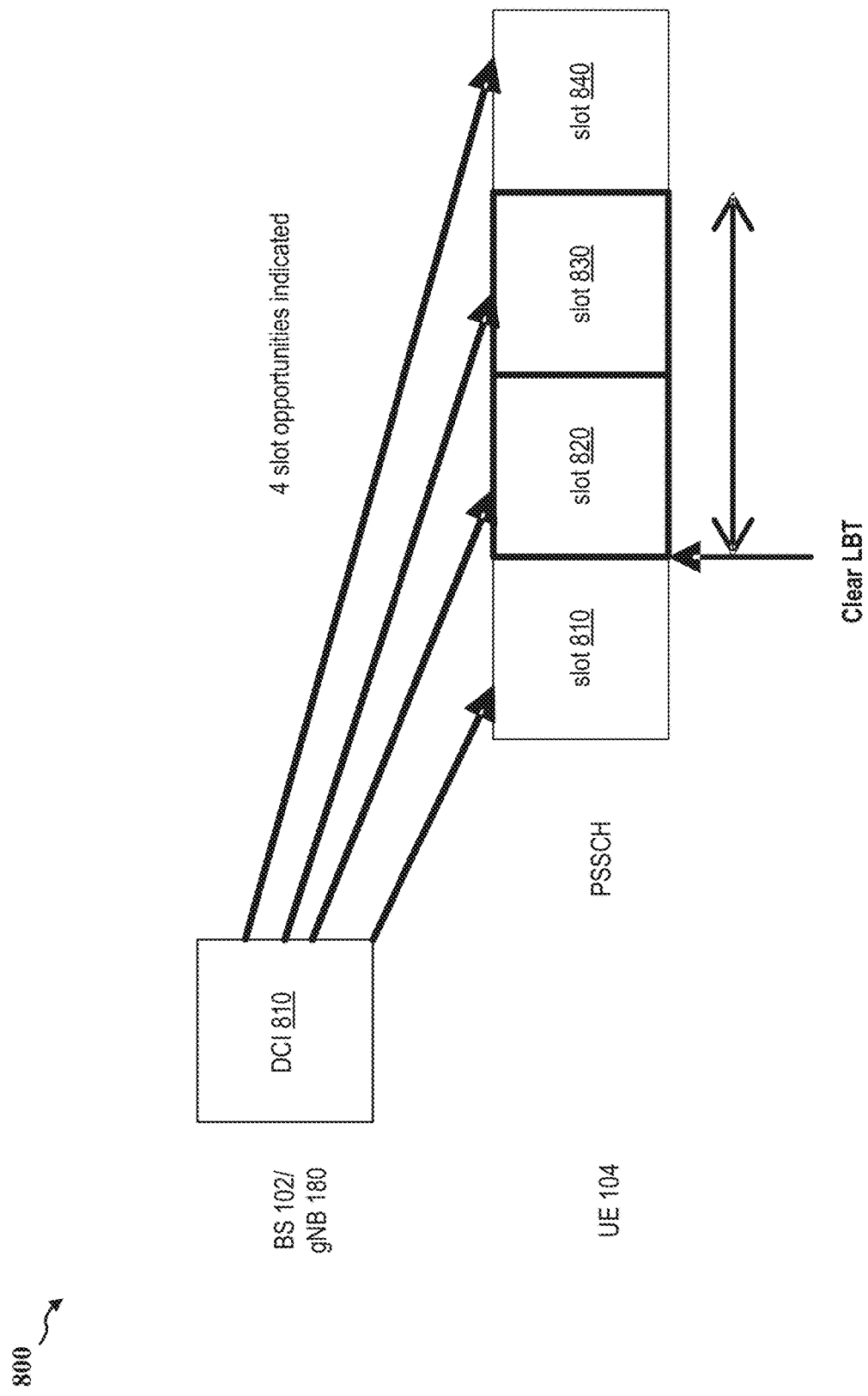
FIG. 8 is a diagram of an example of multi-opportunity grant scheduling for multiple transport blocks (TBs) for sidelink communications, in accordance with various aspects of the present disclosure.

FIG. 8 is a diagram of an example 800 of multi-opportunity grant scheduling for multiple TBs for sidelink communications. The communication may be based on a slot structure comprising aspects described in connection with FIGS. 2 and 3. For example, a first UE, such as UE 104 of FIG. 1, may receive a grant, such as a multi-opportunity grant 810, from base station 102/gNB 180. The multi-opportunity grant 710 may correspond to a DCI3_0. For multiple TBs, UE 104 selects continuous slots within the multi-opportunity grant 810 indicated contiguous slots for PSCCH/PSSCH transmission after clearing a LBT. For more than a single TB, subsequent TBs may be transmitted in the continuous slots following the first LBT cleared slot.

In an aspect, the multi-opportunity grant 810 may indicate a number of TTI opportunities and a number of continuous slots for actual transmission by UE 104. For example, base station 102/gNB 180 controls the number of slots and subchannels the UE 104 may need to transmit. In this example, if UE 104 clears the LBT procedure at a later portion of the scheduled slots, the slots 820, 830 scheduled for actual transmission may be truncated and terminated at the last scheduled slot. If UE 104 clears the LBT procedure at the last scheduled slot, UE 104 may only transmit one slot.

In an aspect, multi-opportunity grant 810 may indicate a number of TTI opportunities and a maximum number of continuous slots for potential transmission by UE 104. For example, UE 104 may determine the number of slots to be used for communicating transmissions to UE 104' providing for a more decentralized control from base station 102/gNB 180. The number of slots scheduled for actual transmission is similarly determined. For example, if UE 104 clears the LBT procedure at a later portion of the scheduled slots, the slots 820, 830 scheduled for actual transmission may be truncated and terminated at the last scheduled slot. If UE 104 clears the LBT procedure at the last scheduled slot, UE 104 may only transmit one slot.

FIGS. 9 and 10 are diagrams of examples 900 and 1000 of HARQ codebook configurations for sidelink communications. The communication may be based on a slot structure comprising aspects described in connection with FIGS. 2 and 3. For example, the size of sidelink type-2 HARQ codebook in Uu depends on the number of sidelink slots scheduled and each scheduled slot is associated with an actual or virtual SAI. For multi-opportunity grant only a portion of the plurality (x out of the y) scheduled slots are used for transmission. Improved HARQ bits saving may be achieved if only the slots used for actual transmission are included in the codebook.

In an aspect, each un-used or used slots within the scheduled multi-opportunity grant is associated with a SAI value and may contribute to the payload of HARQ codebook. For example, the SAI of the first scheduled slot corresponds to the SAI field indicated in the multi-opportunity grant (e.g., DCI). For the following slots, the virtual SAI values are incremental number with respect to the signaled SAI in the multi-opportunity grant with the order of time first and across grant later or across grant first and time later. In an further example, a negative acknowledgement (NACK) is transmitted for the un-used slots. In this example, un-used slots may correspond to LBT failure at the beginning of the scheduled slots or there are no additional TBs to transmit after the actual transmitted slot.

In an aspect, only the number or the maximum number of slots signaled for actual transmission contribute to the HARQ codebook. For example, among the scheduled slots, only the LBT cleared slots signaled for actual transmission have associated actual or virtual SAI. The DCI SAI field corresponds to the first LBT clear slot and the remaining slots are associated with incremental virtual SAI values. In an instance, if the signaled slots go out of bound of the indicated opportunity slots due to the LBT procedure, all of the out of bound slots are padded with NACKs.

In an aspect, a first UE, such as UE 104 of FIG. 1, may receive DCI 910 from base station 102/gNB 180 which indicates four slot opportunities. UE 104 may perform a LBT procedure which clears for slot 920 and results in two slots or a maximum of two slots signaled for actual transmission (e.g., slots 920 and 930). Slot 920 may have a SAI value corresponding to the DCI SAI field of DCI 910 while slot 930 has an incremented virtual SAI value.

In an aspect, for example 1000, UE 104 may receive DCI 1010 from base station 102/gNB 180 which indicates four slot opportunities. UE 104 may perform a LBT procedure which clears for slot 1020. However, in this example, the signaled slot 1030 go out of bound of the indicated opportunity slots due to the LBT procedure, so slot 1030 is padded with NACK.

Turning now to FIG. 11, aspects are depicted with reference to one or more components and one or more methods that may perform the actions or operations described herein, where aspects in dashed line may be optional. Although the operations described below in FIG. 11 is presented in a particular order and/or as being performed by an example component, it should be understood that the ordering of the actions and the components performing the actions may be varied, depending on the implementation. Moreover, it should be understood that the following actions, functions, and/or described components may be performed by reference to one or more components of FIGS. 1, 2, 3, 12 and/or 13, as described herein, a specially-programmed processor, a processor executing specially-programmed software or computer-readable media, or by any other combination of a hardware component and/or a software component capable of performing the described actions or functions.

FIG. 11 illustrates a flow chart of an example of a method 1100 for wireless communication at a UE, such as the UE 104. In an example, a UE 104 can perform the functions described in method 1100 using one or more of the components described in FIGS. 1, 2, 3, 12 and/or 13.

At block 1102, the method 1100 may receive a multi-opportunity grant from a network entity, the multi-opportunity grant indicating multiple LBT opportunities for scheduling a transmission between the first UE and a second UE. In an aspect, the sidelink communication component 140, e.g., in conjunction with processor(s) 1312, memory 1316, and/or transceiver 1302, may be configured to receive a multi-opportunity grant from a network entity 102, the multi-opportunity grant indicating multiple LBT opportunities for scheduling a transmission between the first UE and a second UE. Thus, the UE 104, the processor(s) 1312, the sidelink communication component 140 or one of its sub-components may define the means for receiving a multi-opportunity grant from a network entity, the multi-opportunity grant indicating multiple LBT opportunities for scheduling a transmission between the first UE and a second UE. For example, in an aspect, the UE 104 and/or the sidelink communication component 140 may receive a signal, process the signal into a grant, and/or performs other signal processes such as described above with respect to FIG. 13.

At block 1104, the method 1100 may perform a LBT procedure for one or more slots of a plurality of slots indicated by the multiple LBT opportunities. In an aspect, the sidelink communication component 140, e.g., in conjunction with processor(s) 1312, memory 1316, and/or transceiver 1302, may be configured to perform a LBT procedure for one or more slots of a plurality of slots indicated by the multiple LBT opportunities. Thus, the UE 104, the processor (s) 1312, the sidelink communication component 140 or one of its subcomponents may define the means for performing a LBT procedure for one or more slots of a plurality of slots indicated by the multiple LBT opportunities. For example, in an aspect, the UE 104 and/or the sidelink communication component 140 may process the signal, perform a LBT procedure, and/or performs other signal processes such as described above with respect to FIG. 13.

At block 1106, the method 1100 may select a first slot of the plurality of slots corresponding to an earliest available LBT based on performing the LBT procedure. In an aspect, the sidelink communication component 140, e.g., in conjunction with processor(s) 1312, memory 1316, and/or transceiver 1302, may be configured to select a first slot of the plurality of slots corresponding to an earliest available LBT based on performing the LBT procedure. Thus, the UE 104, the processor(s) 1312, the sidelink communication component 140 or one of its subcomponents may define the means for selecting a first slot of the plurality of slots corresponding to an earliest available LBT based on performing the LBT procedure. For example, in an aspect, the UE 104 and/or the sidelink communication component 140 may perform selections of slots, and/or performs other signal processes such as described above with respect to FIG. 13.

At block 1108, the method 1100 may communicate a transmission to the second UE during the TTI of the first slot. In an aspect, the sidelink communication component 140, e.g., in conjunction with processor(s) 1312, memory 1316, and/or transceiver 1302, may be configured to communicate a transmission to the second UE 104' during the TTI of the first slot. Thus, the UE 104, the processor(s) 1312, the sidelink communication component 140 or one of its subcomponents may define the means for communicating a transmission to the second UE 104' during the TTI of the first slot. For example, in an aspect, the UE 104 and/or the sidelink communication component 140 may process the transmission into a signal, transmit the signal, and/or performs other signal processes such as described above with respect to FIG. 13.

In some aspects, the multi-opportunity grant corresponds to a DCI configured to schedule multiple slots in a transmission pool in a TDRA field.

In some aspects, the multi-opportunity grant includes a time resource assignment in a sidelink control information (SCI) field to schedule multiple slots.

In some aspects, the sidelink communication component 140, e.g., in conjunction with processor(s) 1312, memory 1316, and/or transceiver 1302, configured to communicate the transmission to the second UE during the TTI of the first slot further comprises transmitting a first TB of a plurality of TBs held in a buffer during the TTI of the first slot. For example, each TB is transmitted in one slot. For multiple TBs, a first set of slots may be used for transmission.

In some aspects, the sidelink communication component 140, e.g., in conjunction with processor(s) 1312, memory 1316, and/or transceiver 1302, configured to perform the LBT procedure for one or more slots of the plurality of slots indicated by the multiple LBT opportunities further comprises performing the LBT procedure on an initial slot of the plurality of slots; determining that the LBT procedure on the initial slot resulted in a failure; and sequentially performing the LBT procedure on a remainder of slots of the plurality of slots until first successful result occurs.

In some aspects, the sidelink communication component 140, e.g., in conjunction with processor(s) 1312, memory 1316, and/or transceiver 1302, configured to select the first slot of the plurality of slots corresponding to the earliest available LBT based on performing the LBT procedure further comprises selecting a plurality of continuous slots beginning with the first slot of the plurality of slots indicated by the multi-opportunity grant after clearing the earliest available LBT.

In some aspects, the sidelink communication component 140, e.g., in conjunction with processor(s) 1312, memory 1316, and/or transceiver 1302, configured to communicate the transmission to the second UE further comprises communicating a plurality of TBs via the plurality of continuous slots to the second UE following the earliest available LBT.

In some aspects, the multi-opportunity grant indicates a number of TTI opportunities and a number of continuous slots for communicating transmissions from the first UE to the second UE.

In some aspects, the sidelink communication component 140, e.g., in conjunction with processor(s) 1312, memory 1316, and/or transceiver 1302, may be configured to determine whether a number of slots needed for communicating to the second UE exceed a number of available slots of the number of continuous slots after clearing the earliest available LBT; decrease the number of slots needed for communicating to the second UE based on a determination that the number of slots needed for communicating to the second UE exceed the number of available slots of the number of continuous slots after clearing the earliest available LBT, wherein the decreased number of slots terminates at a last scheduled slot of the number of continuous slots; and wherein communicating the transmission to the second UE during the TTI of the first slot further comprises communicating transmissions on the decreased number of slots to the second UE.

In some aspects, the multi-opportunity grant indicates a number of TTI opportunities and a maximum number of continuous slots for potential transmissions from the first UE to the second UE.

In some aspects, the sidelink communication component 140, e.g., in conjunction with processor(s) 1312, memory 1316, and/or transceiver 1302, may be configured to determine a number of continuous slots for communicating transmissions to the second UE based on the maximum number of continuous slots for potential transmissions.

In some aspects, the sidelink communication component 140, e.g., in conjunction with processor(s) 1312, memory 1316, and/or transceiver 1302, may be configured to determine whether a number of slots needed for communicating to the second UE exceed a number of available slots of the number of continuous slots after clearing the earliest available LBT; decrease the number of slots needed for communicating to the second UE based on a determination that the number of slots needed for communicating to the second UE exceed the number of available slots of the number of continuous slots after clearing the earliest available LBT, wherein the decreased number of slots terminates at a last scheduled slot of the number of continuous slots; and wherein communicating the transmission to the second UE during the TTI of the first slot further comprises communicating transmissions on the decreased number of slots to the second UE.

In some aspects, the sidelink communication component 140, e.g., in conjunction with processor(s) 1312, memory 1316, and/or transceiver 1302, configured to select the first slot of the plurality of slots corresponding to the earliest available LBT based on performing the LBT procedure further comprises determining a plurality of scheduled slots for communicating to the second UE beginning with the first slot of the plurality of slots; and associating a respective SAI value to each of the plurality of slots indicated by the multi-opportunity grant including the plurality of scheduled slots and any unused slots of the plurality of slots.

In some aspects, the respective SAI value of the first slot corresponds to a SAI field indicated in the multi-opportunity grant.

In some aspects, the respective SAI value for each of a remaining portion of the plurality of scheduled slots correspond to respective virtual SAI value having an incremental number with respect to the respective SAI value corresponding to the SAI field indicated in the multi-opportunity grant.

In some aspects, the respective virtual SAI value include at least one of an order of time first and across grant later or the across grant first and the time later.

In some aspects, the sidelink communication component 140, e.g., in conjunction with processor(s) 1312, memory 1316, and/or transceiver 1302, may be configured to communicate the transmission to the second UE further comprises transmitting a NACK for the unused slots of the plurality of slots to the network entity.

In some aspects, the sidelink communication component 140, e.g., in conjunction with processor(s) 1312, memory 1316, and/or transceiver 1302, configured to select the first slot of the plurality of slots corresponding to the earliest available LBT based on performing the LBT procedure further comprises determining a plurality of scheduled slots for communicating to the second UE beginning with the first slot of the plurality of slots; and associating a respective SAI value to each of the plurality of scheduled slots.

In some aspects, the respective SAI value of the first slot corresponds to a SAI field indicated in the multi-opportunity grant.

In some aspects, the respective SAI value for each of a remaining portion of the plurality of scheduled slots correspond to respective virtual SAI value having an incremental number with respect to the respective SAI value corresponding to the SAI field indicated in the multi-opportunity grant.

In some aspects, the sidelink communication component 140, e.g., in conjunction with processor(s) 1312, memory 1316, and/or transceiver 1302, may be configured to determine whether any of the plurality of scheduled slots are scheduled after the plurality of slots indicated by the multi-opportunity grant; and wherein communicating the transmission to the second UE further comprises transmitting a negative acknowledgement (NACK) for any of the plurality of scheduled slots are scheduled after the plurality of slots indicated by the multi-opportunity grant.

Referring to FIG. 12, one example of an implementation of a node acting as an IAB node, such as base station 102 (e.g., a base station 102 and/or gNB 180, as described above) may include a variety of components, some of which have already been described above and are described further herein, including components such as one or more processors 1212 and memory 1216 and transceiver 1202 in communication via one or more buses 1243, which may operate in conjunction with modem 1240 and/or sidelink configuration component 1242 for configuring sidelink communications between a first UE 104 and a second UE 104'.

In an aspect, the one or more processors 1212 can include a modem 1240 and/or can be part of the modem 1240 that uses one or more modem processors. Thus, the various functions related to BS communicating component 1242 may be included in modem 1240 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 1240 associated with BS communicating component 1242 may be performed by transceiver 1202.

Also, memory 1216 may be configured to store data used herein and/or local versions of applications 1275 or BS communicating component 1242 and/or one or more of its subcomponents being executed by at least one processor 1212. Memory 1216 can include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be a non-transitory computer-readable storage medium that stores one or more computer-executable codes defining BS communicating component 1242 and/or one or more of its subcomponents, and/or data associated therewith, when base station 102 is operating at least one processor 1212 to execute sidelink configuration component 1242 and/or one or more of its subcomponents.

Transceiver 1202 may include at least one receiver 1206 and at least one transmitter 1208. Receiver 1206 may include hardware and/or software executable by a processor for receiving data, the code comprising instructions and being stored in a memory (e.g., computer-readable medium). Receiver 1206 may be, for example, a radio frequency (RF) receiver. In an aspect, receiver 1206 may receive signals transmitted by at least one base station 102. Additionally, receiver 1206 may process such received signals, and also may obtain measurements of the signals, such as, but not limited to, Ec/Io, signal-to-noise ratio (SNR), reference signal received power (RSRP), received signal strength indicator (RSSI), etc. Transmitter 1208 may include hardware and/or software executable by a processor for transmitting data, the code comprising instructions and being stored in a memory (e.g., computer-readable medium). A suitable example of transmitter 1208 may including, but is not limited to, an RF transmitter.

Moreover, in an aspect, base station 102 may include RF front end 1288, which may operate in communication with one or more antennas 1265 and transceiver 1202 for receiving and transmitting radio transmissions, for example, wireless communications transmitted by at least one base station 102 or wireless transmissions transmitted by UE 104. RF front end 1288 may be connected to one or more antennas 1265 and can include one or more low-noise amplifiers (LNAs) 1290, one or more switches 1292, one or more power amplifiers (PAs) 1298, and one or more filters 1296 for transmitting and receiving RF signals. The antennas 1265 may include one or more antennas, antenna elements, and/or antenna arrays.

In an aspect, LNA 1290 can amplify a received signal at a desired output level. In an aspect, each LNA 1290 may have a specified minimum and maximum gain values. In an aspect, RF front end 1288 may use one or more switches 1292 to select a particular LNA 1290 and its specified gain value based on a desired gain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and its specified gain value based on a desired gain value for a particular application.

Also, for example, one or more filters 1296 can be used by RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, RF front end 1288 can use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 1265 via RF front end 1288. In an aspect, transceiver may be tuned to operate at specified frequencies such that UE 104 can communicate with, for example, one or more base stations 102 or one or more cells associated with one or more base stations 102. In an aspect, for example, modem 1240 can configure transceiver 1202 to operate at a specified frequency and power level based on the UE configuration of the UE 104 and the communication protocol used by modem 1240.

In an aspect, modem 1240 can be a multiband-multimode modem, which can process digital data and communicate with transceiver 1202 such that the digital data is sent and received using transceiver 1202. In an aspect, modem 1240 can be multiband and be configured to support multiple frequency bands for a specific communications protocol. In an aspect, modem 1240 can be multimode and be configured to support multiple operating networks and communications protocols. In an aspect, modem 1240 can control one or more components of UE 104 (e.g., RF front end 1288, transceiver 1202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 1212 may correspond to one or more of the processors described in connection with the UE in FIG. 4. Similarly, the memory 1216 may correspond to the memory described in connection with the UE in FIG. 4.

Figure 13:
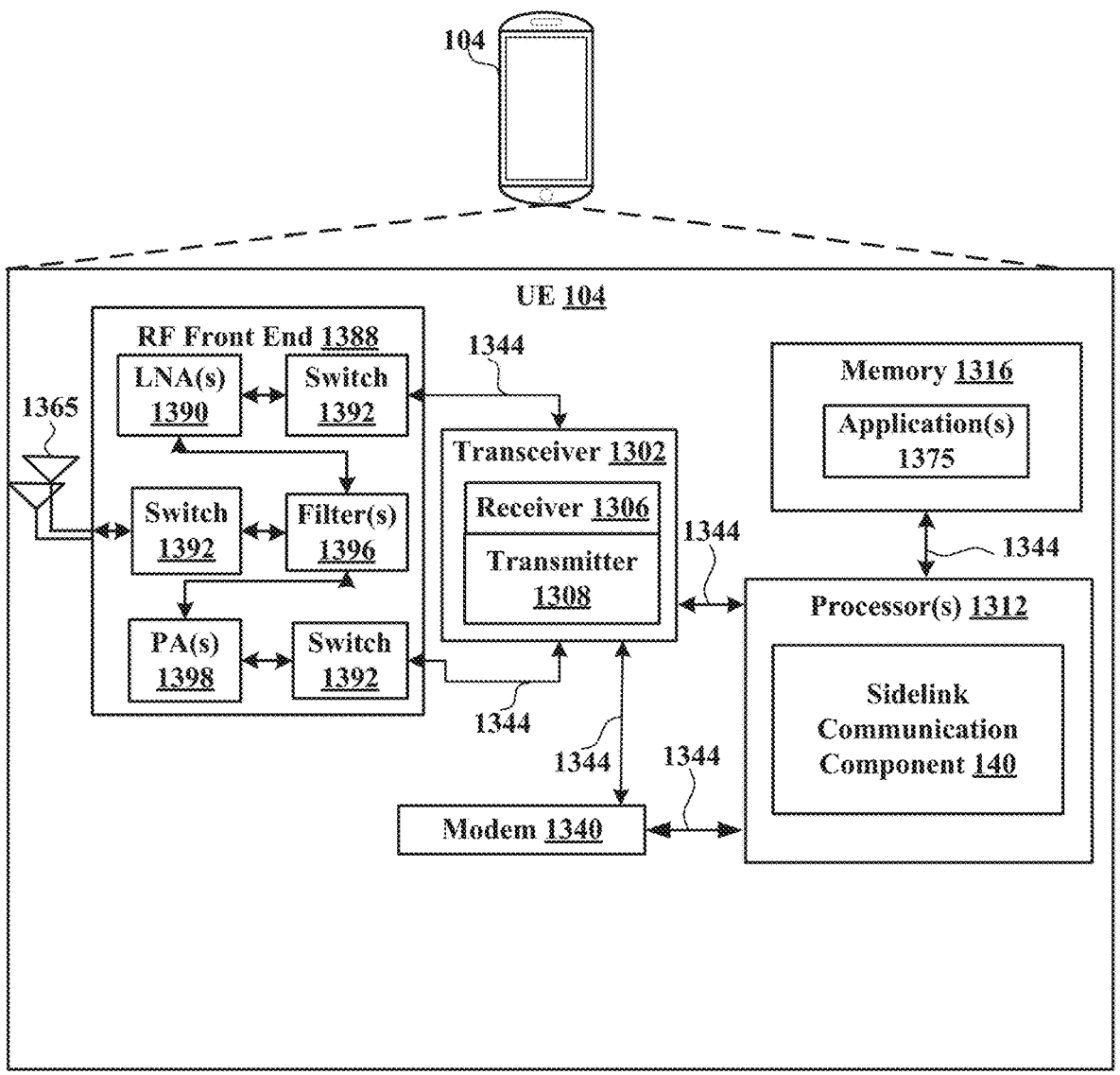
FIG. 13 is a block diagram illustrating an example of a UE, in accordance with various aspects of the present disclosure.

Referring to FIG. 13, one example of an implementation of UE 104 may include a variety of components, some of which have already been described above and are described further herein, including components such as one or more processors 1312 and memory 1316 and transceiver 1302 in communication via one or more buses 1344, which may operate in conjunction with modem 1340 and/or sidelink communication component 140 for configuring sidelink communications with a second UE 104' based on an indication of repetitive scheduling 254.

The transceiver 1302, receiver 1306, transmitter 1308, one or more processors 1312, memory 1316, applications 1375, buses 1344, RF front end 1388, LNAs 1390, switches 1392, filters 1396, PAs 1398, and one or more antennas 1365 may be the same as or similar to the corresponding components of base station 102, as described above, but configured or otherwise programmed for base station operations as opposed to base station operations.

In an aspect, the processor(s) 1312 may correspond to one or more of the processors described in connection with the base station in FIG. 4. Similarly, the memory 1316 may correspond to the memory described in connection with the base station in FIG. 4.

The following provides an overview of aspects of the present disclosure:

Aspect 1: A method of wireless communication at a first UE, comprising: receiving a multi-opportunity grant from a network entity, the multi-opportunity grant indicating multiple LBT opportunities for scheduling a transmission between the first UE and a second UE; performing a LBT procedure for one or more slots of a plurality of slots indicated by the multiple LBT opportunities; selecting a first slot of the plurality of slots corresponding to an earliest available LBT based on performing the LBT procedure; and communicating a transmission to the second UE during the TTI of the first slot.

Aspect 2: The method of aspect 1, wherein the multi-opportunity grant corresponds to a DCI configured to schedule multiple slots in a transmission pool in a TDRA field.

Aspect 3: The method of aspect 1, wherein the multi-opportunity grant includes a time resource assignment in a SCI field to schedule multiple slots.

Aspect 4: The method of aspect 1, wherein communicating the transmission to the second UE during the TTI of the first slot further comprises transmitting a first TB of a plurality of TBs held in a buffer during the TTI of the first slot.

Aspect 5: The method of aspect 1, wherein performing the LBT procedure for one or more slots of the plurality of slots indicated by the multiple LBT opportunities further comprises: performing the LBT procedure on an initial slot of the plurality of slots; determining that the LBT procedure on the initial slot resulted in a failure; and sequentially performing the LBT procedure on a remainder of slots of the plurality of slots until first successful result occurs.

Aspect 6: The method of aspect 1, wherein selecting the first slot of the plurality of slots corresponding to the earliest available LBT based on performing the LBT procedure further comprises selecting a plurality of continuous slots beginning with the first slot of the plurality of slots indicated by the multi-opportunity grant after clearing the earliest available LBT.

Aspect 7: The method of aspect 1 through 6, wherein communicating the transmission to the second UE further comprises communicating a plurality of TBs via the plurality of continuous slots to the second UE following the earliest available LBT.

Aspect 8: The method of aspect 1 through 6, wherein the multi-opportunity grant indicates a number of TTI opportunities and a number of continuous slots for communicating transmissions from the first UE to the second UE.

Aspect 9: The method of aspect 1 through 8, further comprising: determining whether a number of slots needed for communicating to the second UE exceed a number of available slots of the number of continuous slots after clearing the earliest available LBT; decreasing the number of slots needed for communicating to the second UE based on a determination that the number of slots needed for communicating to the second UE exceed the number of available slots of the number of continuous slots after clearing the earliest available LBT, wherein the decreased number of slots terminates at a last scheduled slot of the number of continuous slots; and wherein communicating the transmission to the second UE during the TTI of the first slot further comprises communicating transmissions on the decreased number of slots to the second UE.

Aspect 10: The method of aspect 1 through 6, wherein the multi-opportunity grant indicates a number of TTI opportunities and a maximum number of continuous slots for potential transmissions from the first UE to the second UE.

Aspect 11: The method of aspect 1 through 10, further comprising determining a number of continuous slots for communicating transmissions to the second UE based on the maximum number of continuous slots for potential transmissions.

Aspect 12: The method of aspect 1 through 11, further comprising: determining whether a number of slots needed for communicating to the second UE exceed a number of available slots of the number of continuous slots after clearing the earliest available LBT; decreasing the number of slots needed for communicating to the second UE based on a determination that the number of slots needed for communicating to the second UE exceed the number of available slots of the number of continuous slots after clearing the earliest available LBT, wherein the decreased number of slots terminates at a last scheduled slot of the number of continuous slots; and wherein communicating the transmission to the second UE during the TTI of the first slot further comprises communicating transmissions on the decreased number of slots to the second UE.

Aspect 13: The method of aspect 1, wherein selecting the first slot of the plurality of slots corresponding to the earliest available LBT based on performing the LBT procedure further comprises: determining a plurality of scheduled slots for communicating to the second UE beginning with the first slot of the plurality of slots; and associating a respective SAI value to each of the plurality of slots indicated by the multi-opportunity grant including the plurality of scheduled slots and any unused slots of the plurality of slots.

Aspect 14: The method of aspect 1 through 13, wherein the respective SAI value of the first slot corresponds to a SAI field indicated in the multi-opportunity grant.

Aspect 15: The method of aspect 1 through 14, wherein the respective SAI value for each of a remaining portion of the plurality of scheduled slots correspond to respective virtual SAI value having an incremental number with respect to the respective SAI value corresponding to the SAI field indicated in the multi-opportunity grant.

Aspect 16: The method of aspect 1 through 15, wherein the respective virtual SAI value include at least one of an order of time first and across grant later or the across grant first and the time later.

Aspect 17: The method of aspect 1 through 13, wherein communicating the transmission to the second UE further comprises transmitting a NACK for the unused slots of the plurality of slots to the network entity.

Aspect 18: The method of aspect 1, wherein selecting the first slot of the plurality of slots corresponding to the earliest available LBT based on performing the LBT procedure further comprises: determining a plurality of scheduled slots for communicating to the second UE beginning with the first slot of the plurality of slots; and associating a respective SAI value to each of the plurality of scheduled slots.

Aspect 19: The method of aspect 1 through 18, wherein the respective SAI value of the first slot corresponds to a SAI field indicated in the multi-opportunity grant.

Aspect 20: The method of aspect 1 through 19, wherein the respective SAI value for each of a remaining portion of the plurality of scheduled slots correspond to respective virtual SAI value having an incremental number with respect to the respective SAI value corresponding to the SAI field indicated in the multi-opportunity grant.

Aspect 21: The method of aspect 1 through 18, further comprising: determining whether any of the plurality of scheduled slots are scheduled after the plurality of slots indicated by the multi-opportunity grant; and wherein communicating the transmission to the second UE further comprises transmitting a NACK for any of the plurality of scheduled slots are scheduled after the plurality of slots indicated by the multi-opportunity grant.

Aspect 22: An apparatus for wireless communication at a first UE, comprising: a transceiver; a memory configured to store instructions; and one or more processors communicatively coupled with the transceiver and the memory, wherein the one or more processors are configured to execute the instructions to: receive a multi-opportunity grant from a network entity, the multi-opportunity grant indicating multiple LBT opportunities for scheduling a transmission between the first UE and a second UE; perform a LBT procedure for one or more slots of a plurality of slots indicated by the multiple LBT opportunities; select a first slot of the plurality of slots corresponding to an earliest available LBT based on performing the LBT procedure; and communicate a transmission to the second UE during the TTI of the first slot.

Aspect 23: The apparatus of aspect 22, wherein the multi-opportunity grant corresponds to a DCI configured to schedule multiple slots in a transmission pool in a TDRA field.

Aspect 24: The apparatus of aspect 22, wherein the multi-opportunity grant includes a time resource assignment in a SCI field to schedule multiple slots.

Aspect 25: The apparatus of aspect 22, wherein one or more processors configured to perform the LBT procedure for one or more slots of the plurality of slots indicated by the multiple LBT opportunities are further configured to: perform the LBT procedure on an initial slot of the plurality of slots; determine that the LBT procedure on the initial slot resulted in a failure; and sequentially perform the LBT procedure on a remainder of slots of the plurality of slots until first successful result occurs.

Aspect 26: The apparatus of aspect 22, wherein one or more processors configured to select the first slot of the plurality of slots corresponding to the earliest available LBT based on performing the LBT procedure are further configured to select a plurality of continuous slots beginning with the first slot of the plurality of slots indicated by the multi-opportunity grant after clearing the earliest available LBT.

Aspect 27: The apparatus of aspect 22, wherein one or more processors configured to select the first slot of the plurality of slots corresponding to the earliest available LBT based on performing the LBT procedure are further configured to: determine a plurality of scheduled slots for communicating to the second UE beginning with the first slot of the plurality of slots; and associate a respective SAI value to each of the plurality of slots indicated by the multi-opportunity grant including the plurality of scheduled slots and any unused slots of the plurality of slots.

Aspect 28: The apparatus of aspect 22, wherein one or more processors configured to select the first slot of the plurality of slots corresponding to the earliest available LBT based on performing the LBT procedure are further configured to: determine a plurality of scheduled slots for communicating to the second UE beginning with the first slot of the plurality of slots; and associate a respective SAI value to each of the plurality of scheduled slots.

Aspect 29: An apparatus for wireless communication at a first UE, comprising: means for receiving a multi-opportunity grant from a network entity, the multi-opportunity grant indicating multiple LBT opportunities for scheduling a transmission between the first UE and a second UE; means for performing a LBT procedure for one or more slots of a plurality of slots indicated by the multiple LBT opportunities; means for selecting a first slot of the plurality of slots corresponding to an earliest available LBT based on performing the LBT procedure; and means for communicating a transmission to the second UE during the TTI of the first slot.

Aspect 30: A non-transitory computer-readable medium at a first UE, comprising code executable by one or more processors to: receiving a multi-opportunity grant from a network entity, the multi-opportunity grant indicating multiple LBT opportunities for scheduling a transmission between the first UE and a second UE; performing a LBT procedure for one or more slots of a plurality of slots indicated by the multiple LBT opportunities; selecting a first slot of the plurality of slots corresponding to an earliest available LBT based on performing the LBT procedure; and communicating a transmission to the second UE during the TTI of the first slot.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication at a first user equipment (UE), comprising:
   receiving a multi-opportunity grant from a network entity, the multi-opportunity grant indicating multiple listen-before-talk (LBT) opportunities corresponding to a plurality of slots for scheduling a transmission between the first UE and a second UE;
   performing a LBT procedure for one or more slots of the plurality of slots indicated by the multiple LBT opportunities;
   selecting a first slot of the plurality of slots corresponding to an earliest available LBT based on performing the LBT procedure; and
   communicating a transmission to the second UE during a transmission time interval (TTI) of the first slot.

2. The method of claim 1, wherein the multi-opportunity grant corresponds to a downlink control information (DCI) configured to schedule the plurality of slots in a transmission pool in a time domain resource assignment (TDRA) field.

3. The method of claim 1, wherein the multi-opportunity grant includes a time resource assignment in a sidelink control information (SCI) field to schedule the plurality of slots.

4. The method of claim 1, wherein communicating the transmission to the second UE during the TTI of the first slot further comprises transmitting a first transport block (TB) of a plurality of TBs held in a buffer during the TTI of the first slot.

5. The method of claim 1, wherein performing the LBT procedure for one or more slots of the plurality of slots indicated by the multiple LBT opportunities further comprises:
   performing the LBT procedure on an initial slot of the plurality of slots;
   determining that the LBT procedure on the initial slot resulted in a failure; and
   sequentially performing the LBT procedure on a remainder of slots of the plurality of slots until first successful result occurs.

6. The method of claim 1, wherein selecting the first slot of the plurality of slots corresponding to the earliest available LBT based on performing the LBT procedure further comprises selecting a plurality of continuous slots beginning with the first slot of the plurality of slots indicated by the multi-opportunity grant after clearing the earliest available LBT.

7. The method of claim 6, wherein communicating the transmission to the second UE further comprises communicating a plurality of transport blocks (TBs) via the plurality of continuous slots to the second UE following the earliest available LBT.

8. The method of claim 6, wherein the multi-opportunity grant indicates a number of TTI opportunities and a number of continuous slots for communicating transmissions from the first UE to the second UE.

9. The method of claim 8, further comprising:
   determining whether a number of slots needed for communicating to the second UE exceed a number of available slots of the number of continuous slots after clearing the earliest available LBT;
   decreasing the number of slots needed for communicating to the second UE based on a determination that the number of slots needed for communicating to the second UE exceed the number of available slots of the number of continuous slots after clearing the earliest available LBT, wherein the decreased number of slots terminates at a last scheduled slot of the number of continuous slots; and
   wherein communicating the transmission to the second UE during the TTI of the first slot further comprises communicating transmissions on the decreased number of slots to the second UE.

10. The method of claim 6, wherein the multi-opportunity grant indicates a number of TTI opportunities and a maximum number of continuous slots for potential transmissions from the first UE to the second UE.

11. The method of claim 10, further comprising determining a number of continuous slots for communicating transmissions to the second UE based on the maximum number of continuous slots for potential transmissions.

12. The method of claim 11, further comprising:
   determining whether a number of slots needed for communicating to the second UE exceed a number of available slots of the number of continuous slots after clearing the earliest available LBT;
   decreasing the number of slots needed for communicating to the second UE based on a determination that the number of slots needed for communicating to the second UE exceed the number of available slots of the number of continuous slots after clearing the earliest available LBT, wherein the decreased number of slots terminates at a last scheduled slot of the number of continuous slots; and
   wherein communicating the transmission to the second UE during the TTI of the first slot further comprises communicating transmissions on the decreased number of slots to the second UE.

13. The method of claim 1, wherein selecting the first slot of the plurality of slots corresponding to the earliest available LBT based on performing the LBT procedure further comprises:
   determining a plurality of scheduled slots for communicating to the second UE beginning with the first slot of the plurality of slots; and
   associating a respective sidelink access indication (SAI) value to each of the plurality of slots indicated by the multi-opportunity grant including the plurality of scheduled slots and any unused slots of the plurality of slots.

14. The method of claim 13, wherein the respective SAI value of the first slot corresponds to a SAI field indicated in the multi-opportunity grant.

15. The method of claim 14, wherein the respective SAI value for each of a remaining portion of the plurality of scheduled slots correspond to respective virtual SAI value having an incremental number with respect to the respective SAI value corresponding to the SAI field indicated in the multi-opportunity grant.

16. The method of claim 15, wherein the respective virtual SAI value include at least one of an order of time first and across grant later or the across grant first and the time later.

17. The method of claim 13, wherein communicating the transmission to the second UE further comprises transmitting a negative acknowledgement (NACK) for the unused slots of the plurality of slots to the network entity.

18. The method of claim 1, wherein selecting the first slot of the plurality of slots corresponding to the earliest available LBT based on performing the LBT procedure further comprises:
 determining a plurality of scheduled slots for communicating to the second UE beginning with the first slot of the plurality of slots; and
 associating a respective sidelink access indication (SAI) value to each of the plurality of scheduled slots.

19. The method of claim 18, wherein the respective SAI value of the first slot corresponds to a SAI field indicated in the multi-opportunity grant.

20. The method of claim 19, wherein the respective SAI value for each of a remaining portion of the plurality of scheduled slots correspond to respective virtual SAI value having an incremental number with respect to the respective SAI value corresponding to the SAI field indicated in the multi-opportunity grant.

21. The method of claim 18, further comprising:
 determining whether any of the plurality of scheduled slots are scheduled after the plurality of slots indicated by the multi-opportunity grant; and
 wherein communicating the transmission to the second UE further comprises transmitting a negative acknowledgement (NACK) for any of the plurality of scheduled slots are scheduled after the plurality of slots indicated by the multi-opportunity grant.

22. An apparatus for wireless communication at a first user equipment (UE), comprising:
 a transceiver;
 a memory configured to store instructions; and
 one or more processors, individually or in combination, communicatively coupled with the transceiver and the memory, wherein the one or more processors, individually or in combination, are configured to execute the instructions to:
 receive a multi-opportunity grant from a network entity, the multi-opportunity grant indicating multiple listen-before-talk (LBT) opportunities corresponding to a plurality of slots for scheduling a transmission between the first UE and a second UE;
 perform a LBT procedure for one or more slots of the plurality of slots indicated by the multiple LBT opportunities;
 select a first slot of the plurality of slots corresponding to an earliest available LBT based on performing the LBT procedure; and
 communicate a transmission to the second UE during a transmission time interval (TTI) of the first slot.

23. The apparatus of claim 22, wherein the multi-opportunity grant corresponds to a downlink control information (DCI) configured to schedule the plurality of slots in a transmission pool in a time domain resource assignment (TDRA) field.

24. The apparatus of claim 22, wherein the multi-opportunity grant includes a time resource assignment in a sidelink control information (SCI) field to schedule the plurality of slots.

25. The apparatus of claim 22, wherein the one or more processors configured to perform the LBT procedure for one or more slots of the plurality of slots indicated by the multiple LBT opportunities are further configured to:
 perform the LBT procedure on an initial slot of the plurality of slots;
 determine that the LBT procedure on the initial slot resulted in a failure; and
 sequentially perform the LBT procedure on a remainder of slots of the plurality of slots until first successful result occurs.

26. The apparatus of claim 22, wherein the one or more processors configured to select the first slot of the plurality of slots corresponding to the earliest available LBT based on performing the LBT procedure are further configured to select a plurality of continuous slots beginning with the first slot of the plurality of slots indicated by the multi-opportunity grant after clearing the earliest available LBT.

27. The apparatus of claim 22, wherein the one or more processors configured to select the first slot of the plurality of slots corresponding to the earliest available LBT based on performing the LBT procedure are further configured to:
 determine a plurality of scheduled slots for communicating to the second UE beginning with the first slot of the plurality of slots; and
 associate a respective sidelink access indication (SAI) value to each of the plurality of slots indicated by the multi-opportunity grant including the plurality of scheduled slots and any unused slots of the plurality of slots.

28. The apparatus of claim 22, wherein the one or more processors configured to select the first slot of the plurality of slots corresponding to the earliest available LBT based on performing the LBT procedure are further configured to:
 determine a plurality of scheduled slots for communicating to the second UE beginning with the first slot of the plurality of slots; and
 associate a respective sidelink access indication (SAI) value to each of the plurality of scheduled slots.

29. An apparatus for wireless communication at a first user equipment (UE), comprising:
 means for receiving a multi-opportunity grant from a network entity, the multi-opportunity grant indicating multiple listen-before-talk (LBT) opportunities corresponding to a plurality of slots for scheduling a transmission between the first UE and a second UE;
 means for performing a LBT procedure for one or more slots of the plurality of slots indicated by the multiple LBT opportunities;
 means for selecting a first slot of the plurality of slots corresponding to an earliest available LBT based on performing the LBT procedure; and
 means for communicating a transmission to the second UE during a transmission time interval (TTI) of the first slot.

30. One or more non-transitory computer-readable media at a first user equipment (UE) comprising computer executable code, the code when executed by one or more processors causes the one or more processors to, individual or in combination:

receive a multi-opportunity grant from a network entity, the multi-opportunity grant indicating multiple listen-before-talk (LBT) opportunities corresponding to a plurality of slots for scheduling a transmission between the first UE and a second UE;

perform a LBT procedure for one or more slots of the plurality of slots indicated by the multiple LBT opportunities;

select a first slot of the plurality of slots corresponding to an earliest available LBT based on performing the LBT procedure; and communicate a transmission to the second UE during a transmission time interval (TTI) of the first slot.

\* \* \* \* \*